(12) United States Patent
Borole

(10) Patent No.: US 7,695,834 B1
(45) Date of Patent: Apr. 13, 2010

(54) MICROBIAL FUEL CELL WITH IMPROVED ANODE

(75) Inventor: Abhijeet P. Borole, Knoxville, TN (US)

(73) Assignee: UT-Battelle, LLC, Knoxville, TN (US)

( * ) Notice: Subject to any disclaimer, the term of this patent is extended or adjusted under 35 U.S.C. 154(b) by 0 days.

(21) Appl. No.: 12/252,015

(22) Filed: Oct. 15, 2008

(51) Int. Cl.
*H01M 4/90* (2006.01)

(52) U.S. Cl. .............................. 429/2; 429/43; 502/101; 427/115

(58) Field of Classification Search ................... 429/2
See application file for complete search history.

(56) References Cited

U.S. PATENT DOCUMENTS

| | | | |
|---|---|---|---|
| 4,652,501 A * | 3/1987 | Bennetto et al. ................ | 429/2 |
| 6,554,977 B2 * | 4/2003 | Hu et al. ...................... | 204/253 |
| 2006/0147763 A1 | 7/2006 | Angenent et al. | |
| 2006/0234110 A1* | 10/2006 | Bergel .......................... | 429/43 |
| 2007/0012620 A1 | 1/2007 | Murphy | |
| 2007/0048577 A1 | 3/2007 | Ringeisen et al. | |
| 2007/0134520 A1* | 6/2007 | Shimomura et al. ............. | 429/2 |
| 2007/0259216 A1 | 11/2007 | Logan | |
| 2007/0259217 A1 | 11/2007 | Logan | |
| 2008/0182308 A1* | 7/2008 | Donaldson et al. .......... | 435/160 |
| 2008/0292912 A1* | 11/2008 | Logan et al. .................... | 429/2 |

OTHER PUBLICATIONS

Logan, B.E. at al., "Microbial Fuel Cells: Methodology and Technology", Environmental Science & Technology, 2006, vol. 40, No. 17, 5181-5192.

Lovley, D. R., "Microbial fuel cells; novel microbial physiologies and engineering approaches", Current Opinions in Biotechnology, 2006, vol. 17, 327-332.

Min, B. et al., "Continuous Electricity Generation from Domestic Wastewater and Organic Substrates in a Flat Plate microbial Fuel Cell", Environmental Science & Technology, 2004, vol. 38, No. 21, 5809-5814.

Liu, J. L. et al., "Influence of anode pretreatment on its microbial colonization", Journal of Applied Microbiology, 2007, vol. 102, 177-183.

Zang, T. et al.. "Improved performances of *E. coli*-catalyzed microbial fuel cells with composite graphite/PTFE anodes", Electrochemistry Communications, 2007, vol. 9, 349-353.

(Continued)

*Primary Examiner*—Patrick Ryan
*Assistant Examiner*—Brent Thomas
(74) *Attorney, Agent, or Firm*—Scully, Scott, Murphy & Presser, P.C.

(57) ABSTRACT

The present invention relates to a method for preparing a microbial fuel cell, wherein the method includes: (i) inoculating an anodic liquid medium in contact with an anode of the microbial fuel cell with one or more types of microorganisms capable of functioning by an exoelectrogenic mechanism; (ii) establishing a biofilm of the microorganisms on and/or within the anode along with a substantial absence of planktonic forms of the microorganisms by substantial removal of the planktonic microorganisms during forced flow and recirculation conditions of the anodic liquid medium; and (iii) subjecting the microorganisms of the biofilm to a growth stage by incorporating one or more carbon-containing nutritive compounds in the anodic liquid medium during biofilm formation or after biofilm formation on the anode has been established.

53 Claims, 7 Drawing Sheets

OTHER PUBLICATIONS

Freguia, S. et al., "Electron and Carbon Balances in Microbial Fuel Cells Reveal Temporary Bacterial Storage Behavior During Electricity Generation", Environmental Science & Technology, 2007, vol. 41, 2915-2921.

Logan, B.E. et al., "Electricity-producing bacterial communities in microbial fuel cells", Trends in Microbiology, 2006, vol. 14 No. 12, 512-518.

Schubert C., "Citrus of slime", Nature, 2006, vol. 441, 277-279.

Gorby Y.A. et al., "Electrically conductive bacterial nanowires produced by *Shewanella oneidensis* strain MR-1 and other microorganisms", Proc. Natl. Acad. Sci. USA, 2006, vol. 103 No. 30, 11358-11363.

Mohan, S. V. et al., "influence of anodic biofilm growth on bioelectricity production in single chambered mediatorless microbial fuel cell using mixed anaerobic consortia" Biosensors and Bioelectronics, 2008, vol. 24, 41-47.

Min, B. et al., "Electricity generation using membrane and salt bridge microbial fuel cells", Water Research, 2005, vol. 39, 1675-1686.

Kim, J. R. et al., "Power Generation Using Different Cation, Anion and Ultrafiltration Membranes in Microbial Fuel Cells", Environmental Science & Technology, 2007, vol. 41 No. 3, 1004-1009.

ZU0, Y. et al., "Isolation of the Exoelectrogenic Bacterium *Ochrobactrum anthropi* YZ-1 by Using a U-Tube Microbial Fuel Cell", Applied and Environmental Microbiology, 2008, vol. 74 No. 10, 3130-3137.

Cheng, S. et al., "Sustainable and efficient biohydrogen via electrohydrogenesis", PNAS, 2007, vol. 104 No. 47, 18871-18873.

Rabaey, K. et al., "Microbial ecology meets electrochemistry: electricity-driven and driving communities", The ISME Journal, 2007, vol. 1, 9-18.

Rittmann, B.E. et al., "Understanding the Biofilm Anode in MFCs" Arizona State University Biodesign Institute, Center for Environmental Biotechnology, Microbial Fuel Cells First International Symposium, May 27-29, 2008; also available at http://www.microbialfuelcell.org/Presentations/First%20MFC%20symposium/Rittmann%20-%20for%20posting/pdf.

* cited by examiner

MICROBIAL FUEL CELL WITH IMPROVED ANODE

This invention was made with government support under Contract Number DE-AC05-00OR22725 between the United States Department of Energy and UT-Battelle, LLC. The U.S. government has certain rights in this invention.

FIELD OF THE INVENTION

The present invention relates to the field of microbial fuel cells, and more specifically, to mediator-less microbial fuel cells.

BACKGROUND OF THE INVENTION

Microbial fuel cells (MFCs) are fuel cells which operate by using microorganisms that possess the ability to donate electrons to the anode of the fuel cell in order to produce electricity. Such microorganisms are known as exoelectrogenic organisms. Exoelectrogenic organisms can donate electrons to the anode in either of two ways: via mediators (e.g., the numerous dyes used in the art for this purpose) or in the absence of mediators (i.e. a mediator-less MFC).

An MFC contains an anode, a cathode, and a cation-selective permeable material (typically, a membrane) which separates the anodic solution from the cathodic solution. The anode and cathode are electrically connected (e.g., by a wire) outside of the electrode solutions. The microorganisms in contact with the anode oxidatively catabolize organic nutritive compounds, such as glucose, acetate, butyrate, methanol, ethanol, or the like, to produce electrons, protons ($H^+$ ions), and oxidized organic material or carbon dioxide. The electrons are attracted to the anode and travel to the cathode. At the same time, the produced protons travel through the anodic solution and through the cation-selective permeable material to the cathode. At the cathode, oxygen gas (typically from air) reacts with the electrons and protons to produce water according to the reaction:

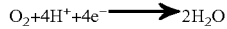

$$O_2 + 4H^+ + 4e^- \longrightarrow 2H_2O$$

A significant benefit of MFCs is their ability to produce electricity by environmentally-friendly and renewable means. Furthermore, MFCs can be fueled by waste products (e.g., waste water from sewage treatment or industrial waste), which are typically valueless and in need of degradation. MFCs can also be configured to produce hydrogen gas by, for example, providing an assistive anodic potential and eliminating oxygen from the cathode such that hydrogen can be produced at the cathode. In turn, there is great interest in hydrogen as a particularly environmentally clean fuel, such as used in ordinary hydrogen fuel cells. There is particular interest in producing hydrogen by environmentally-friendly means. Additionally, MFCs can also be configured to provide electrons to any reductive process requiring electrons, for example, by using a suitable electrode material for the cathode and passing the substrate requiring reduction through the cathode chamber. Some examples of reductive processes include nitrate reduction, uranium reduction and perchlorate reduction (Rabaey, K. et al. *The ISME Journal* 1, 9-18 (2007)). For at least the reasons given, MFCs continue to be the subject of intense research.

There are currently several problems which need to be overcome in order to make MFCs more commercially viable. One problem is that the exoelectrogenic microorganisms being used at the anode represent a small portion of the total amount of microorganisms operating at the anode. In other words, a significant portion of the microorganisms surrounding the anode are non-exoelectrogenic and do not contribute to production of electrical current. Another problem is that, typically, a significant portion of those microorganisms that operate by an exoelectrogenic mechanism do so by the indirect donation of electrons to one or more mediators. Both the low concentration of exoelectrogenic microorganisms and the low proportion of exoelectrogenic microorganisms which can operate by a direct electron transfer mechanism are factors that contribute to a low degree of efficiency in electrical power output. In addition, mediators are often expensive, toxic, and require regular replenishment. Elimination of their use would, therefore, provide many benefits.

Another problem with current MFCs is the occurrence of electrical power fluctuations. The fluctuations are typically caused by corresponding fluctuations in the amount of feed. Such fluctuations are detrimental to the commercial production of electricity. Yet, since such feed fluctuations are typical occurrences for most waste feed sources, a solution is needed to prevent MFC power fluctuations when operating under fluctuating feed conditions.

There is a need in the art for a microbial fuel cell which can operate more efficiently and thereby provide higher electrical power outputs. There is also a need in the art for a microbial fuel cell which can operate more reliably with minimal power fluctuations even during a period of time when a feed level is lowered well below a critical threshold.

SUMMARY OF THE INVENTION

The present invention provides a method for preparation of a microbial fuel cell (MFC) having, inter alia, an improved electrical efficiency and reduced power fluctuation. The invention is also directed to the resulting MFC having these improved properties. Further, the invention is directed to the operation of the MFC.

The method has been realized in a first embodiment by establishing a biofilm of exoelectrogenic microorganisms on the surface of the anode of the MFC along with the substantial absence of planktonic forms (planktons) of the microorganisms. The biofilm is subjected to a growth stage by supplying the biofilm with one or more carbon-containing nutritive compounds, either during or after the biofilm (along with a substantial absence of planktons) has been established. In a preferred embodiment, the method includes the following steps:

inoculating an anodic liquid medium in contact with an anode of the microbial fuel cell with one or more types of microorganisms capable of functioning by an exoelectrogenic mechanism;

establishing a biofilm of the microorganisms on and/or within the anode along with a substantial absence of planktonic forms of the microorganisms by substantial removal of the planktonic microorganisms during forced flow and recirculation conditions of the anodic liquid medium; and subjecting the microorganisms of the biofilm to a growth stage by incorporating one or more carbon-containing nutritive compounds in the anodic liquid medium during biofilm formation or after biofilm formation on the anode has been established.

In the process described above, the anodic liquid medium (anolyte) is contained in an anode chamber and is in contact with the anode. In addition, the cathodic liquid medium (catholyte) is contained in a cathode chamber and is in contact with the cathode. The anolyte can be in contact with the catholyte without a separation, but more typically, the anolyte and catholyte are separated by a cation-selective permeable material, particularly during enrichment stages of the biofilm. The anode and cathode are in electrical communication in order that electrons donated by microorganisms at the anode can travel to the cathode and react with oxygen therein to produce water.

The biofilm formation and growth stage described above provides an anodic biofilm of microorganisms that are enriched, first, in exoelectrogenic microorganisms, and second, exoelectrogenic microorganisms capable of direct electron transfer to the anode (i.e., by a mediator-less mechanism). The greater density of exoelectrogenic microorganisms at the anode improves the electrical power output (i.e., current density or output). The increase in the efficiency by which the microorganisms can transfer electrons to the anode, by virtue of the substantial elimination of mediators, further improves the electrical power output capability of the MFC.

In a further embodiment to the above, the method further includes subjecting the microorganisms of the biofilm to a process that functions to enrich the biofilm microorganisms with microorganisms capable of storing carbon (i.e., carbonaceous compounds or materials) internally. Preferably, this is accomplished by subjecting the biofilm microorganisms after the growth stage to a starvation stage in which carbon-containing nutritive compounds are substantially eliminated from the anodic liquid medium for a period of time sufficient to enrich the biofilm with microorganisms capable of storing carbon internally.

By enriching the anodic biofilm with microorganisms capable of storing carbon internally, the exoelectrogenic microorganisms in the biofilm are capable of supplying electrons to the anode by catabolism of internally-stored carbon-containing compounds. In so doing, the ability of the biofilm microorganisms to produce electricity is rendered less dependent, and even completely independent, of fluctuations in the concentration of carbon-containing nutritive compounds. Accordingly, such microorganisms are then capable of continued production of electricity even when feed concentrations are well below the typical concentrations necessary to provide an acceptable level of electrical power output.

In another embodiment, the method further includes reducing the electrical resistance of the microbial fuel cell in order to operate the microbial fuel cell at an increased electrical current output for a period of time sufficient to further enrich the biofilm with microorganisms capable of functioning by an exoelectrogenic mechanism Thus, as will be described in more detail below, the method advantageously provides a microbial fuel cell which can operate more efficiently and provide higher electrical power outputs. The method further provides a microbial fuel cell that operates more reliably with minimal power fluctuations even during a period of time when a feed level is lowered well below a critical threshold.

DETAILED DESCRIPTION OF THE INVENTION

Figure 1A:
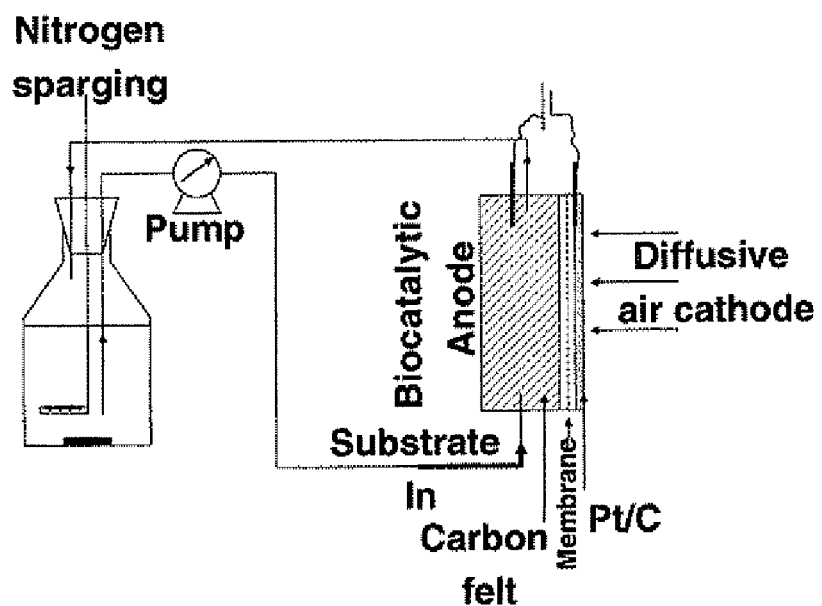
FIG. 1A: Schematic of the MFC recirculation set up with an air-cathode. B: Schematic of the ferricyanide-cathode MFC, C: Photograph of the MFC.

In one aspect, the invention is directed to a method for preparing a microbial fuel cell (MFC) for functional use. In another aspect, the invention is directed to the MFC itself, as prepared according to any one or more of the steps described below.

The MFC contains an anode and a cathode that are in electrical connection, e.g., by a connecting wire that is electrically conductive, such as a copper wire. The anode resides in an anodic liquid medium (i.e., anodic medium) and the cathode resides in a cathodic liquid medium (i.e., cathodic medium), wherein both media are typically aqueous-based. The anodic and cathodic media are typically separated by a cation-selective permeable material, also referred to herein as a cation exchange material. The cation-selective permeable material selectively allows the diffusion or passage of cations, such as hydrogen ions ($H^+$, otherwise referred to herein as "protons") while not allowing the passage of anions, including electrons. The cation-selective permeable material should also substantially prevent oxygen from diffusing from the cathode side into the anode side. A particular type of cation-selective permeable material considered herein is a proton-selective permeable material. The cation-selective or proton-selective permeable material can be any such material known in the art having these properties. Typically, the cation- or proton-selective permeable material is in the form of a membrane, otherwise referred to herein as a cation- or proton-selective permeable membrane or cation or proton exchange membrane (PEM). Any of the PEMs known in the art can be used herein, and more particularly, those belonging to the class of ionomer polyelectrolytes having these properties, such as the Nafion® class of PEMs.

The MFC can have any suitable number of chambers for holding the anodic and cathodic media. For example, the MFC may contain a single chamber wherein anodic and cathodic media are not separated. Alternatively, the anodic and cathodic media may be separated by an aqueous permeable membrane such as a filter paper, cloth, or a specific molecular weight-cut off membrane, such as a 0.2 micron membrane. Alternatively, the MFC may contain two separate chambers, wherein the anodic and cathodic media are separated while being afforded ionic transport therebetween by, for example, a cation- or proton-selective salt bridge, or a glass bridge containing a cation or proton exchange membrane.

In the method, a biofilm of microorganisms is first initiated and then grown (i.e., established) on the anode while the anode is in electrical communication with the cathode such that electrons being donated to the anode from exoelectrogenic microorganisms can be conducted to the cathode. The biofilm can be initiated by contact of the anode with an anodic medium that has been inoculated with a sampling of microorganisms, at least a portion of which should be capable of operating by an exoelectrogenic mechanism. At some point either at the time of contact, or after contact of the anode with the microorganisms in the anodic medium, forced flow and recirculation conditions (i.e., as provided by a pump) are established for the anodic medium. For example, in the case of a porous anode, the anodic medium is made to flow and recirculate through the anode. A significant portion of microorganisms that do not have a strong propensity for forming biofilms, even though they may be initially associated with the biofilm, will be driven into the anodic medium by the flow force. Accordingly, the forced flow and recirculation conditions of the anodic medium serve to enrich the biofilm with microorganisms that have a strong propensity for forming biofilms.

In turn, microorganisms with a strong propensity for forming biofilms are more likely to contain pili (nanowires) on their external membrane which can also be used by the microorganisms for direct electron transfer to the anode. Therefore, the forced flow and recirculation conditions of the anodic medium can also serve to further enrich the biofilm with exoelectrogenic microorganisms capable of direct electron transfer. The advantage of enriching the biofilm with exoelectrogenic microorganisms capable of direct electron transfer is that mediators (e.g., ferric oxides, neutral red, anthraquinone dyes, 1,4-napthoquinone, thionine, methyl viologen, methyl blue, humic acid, and the like) are not needed to permit the electron transfer. As discussed above, not only are mediators typically expensive, toxic, and require replenishment, but mediated electron transfer is much less efficient than direct (mediator-less) electron transfer.

The flow rate of the anodic medium should be high enough to at least maintain planktonic microorganisms floating in the medium. For example, the flow rate is preferably at least about 2 mL/min, and more preferably at least about 3 mL/min. In different embodiments, the flow rate can be either substantially constant or fluctuating within a range of, for example, 2-10 mL/min, or 3-10 mL/min, or 4-10 mL/min, or 5-10 mL/min, or 6-10 mL/min, or 3-8 mL/min, or 3-7 mL/min, or 4-8 mL/min, or 4-7 mL/min. The foregoing flow rates are preferably no more than 10 mL/min and are thus herein referred to as a "low flow rate".

More preferably, the flow rate is high enough to render those biofilm-forming microorganisms with a residual level of planktonic ability (i.e., semi-planktonic microorganisms) waterborne (i.e., floatational), and thus, removable, as further described below. This higher flow rate is preferably above 10 mL/min. In different embodiments, the flow rate can be, for example, at least about 12 mL/min, or at least about 15 mL/min, or at least about 20 mL/min, or at least about 25 mL/min, or at least about 30 mL/min, or at least about 35 mL/min, or at least about 40 mL/min, or at least about 45 mL/min, or at least about 50 mL/min. In different embodiments, the higher flow rate can be either substantially constant or fluctuating within a range of, for example, 12-60 mL/min, 12-50 mL/min, 12-40 mL/min, 12-30 mL/min, 12-20 mL/min, 15-60 mL/min, 15-50 mL/min, 15-40 mL/min, 15-30 mL/min, 15-20 mL/min, 20-60 mL/min, 20-50 mL/min, 20-40 mL/min, 20-35 mL/min, 20-30 mL/min, 25-60 mL/min, 25-50 mL/min, 25-40 mL/min, 25-35 mL/min, 25-30 mL/min, 30-60 mL/min, 30-50 mL/min, 30-40 mL/min, 35-60 mL/min, 35-50 mL/min, 35-40 mL/min, 40-60 mL/min, 40-50 mL/min, 45-60 mL/min, 45-50 mL/min, or 50-60 mL/min.

To reflect changes in volume and cross-sectional area of the MFC, the flow rate can alternatively be represented in terms of space velocity (cm/min) or hydraulic retention time (HRT in units of minutes). To convert flow rates given in units of mL/min into space velocity, the flow rates are divided by the cross-sectional area of the MFC. For example, for a MFC having a cross-sectional area of 1.25 $cm^2$, a flow rate of 2 mL/min corresponds to a space velocity of approximately 1.6 cm/min; a flow rate of 10 mL/min corresponds to a space velocity of 8 cm/min, and a flow rate of 30 mL/min corresponds to a space velocity of 24 cm/min. To convert flow rates given in mL/min into HRT values, the flow rate is inserted into the following equation: HRT=(volume of chamber)/(flow rate in mL/min). For example, for a MFC having a chamber volume of 13.25 mL, a flow rate of 2 mL/min corresponds to a HRT value of approximately 6.6 min.; a flow rate of 10 mL/min corresponds to a HRT value of approximately 1.3 min, and a flow rate of 30 mL/min corresponds to a HRT value of approximately 0.44 min.

In a preferred embodiment, the anodic medium is made to flow at any of the low flow rates or ranges thereof described above on a continuous basis (and either a substantially constant or fluctuating basis) along with periodic, intermittent, or occasional interruptions by any of the higher flow rates or ranges thereof described above. For example, in one embodiment, a continuous low flow rate in the range of 2-10 mL/min is periodically interrupted by a higher flow rate. The higher flow rate is preferably any of the higher flow rates described above, and more particularly, a flow rate greater than 10 mL/min, and more preferably, a flow rate of or greater than 12 or 15 mL/min. In a particularly preferred embodiment, the higher flow rate is at least about 35 mL/min. In another embodiment, a continuous low flow rate in the range of 3-10 mL is periodically interrupted by a higher flow rate in the range of 30-40, 30-50, or 40-50 mL/min. In another embodiment, a continuous low flow rate in the range of 3-7 mL is periodically interrupted by a higher flow rate in the range of 30-40, 30-50, or 40-50 mL/min.

During the forced flow and recirculation conditions, planktonic microorganisms (i.e., those having a propensity to float in solution rather than form a biofilm) are substantially removed by a suitable process (e.g., by use of a syringe). Preferably, any chemicals that may function as mediators are also removed. For example, in a preferred embodiment, planktonic microorganisms are removed by the periodic replacement of all or a portion of the flowing and recirculating anodic medium. Since the majority of planktonic microorganisms and any mediators float in solution, periodic replacement of the anodic medium functions to remove these species.

In different embodiments, the anodic medium may be replaced, either by a set or arbitrary number of times of equivalent volumes of anodic medium, or by a set or arbitrary rate of replacement such that a substantial absence of planktonic microorganisms in the anodic medium is realized. Preferably, a substantial absence of planktonic microorganisms corresponds to at least about 80%, more preferably at least about 85%, more preferably at least about 90%, and even more preferably at least about 95% reduction in concentration of planktonic microorganisms in the flowing and recirculating anodic medium. For example, in one embodiment, the anodic medium is substantially replaced by 1-20 equivalent volumes of anodic medium, either at set intervals or in an arbitrary manner. In another embodiment, the anodic medium is substantially replaced (i.e., at least 90% replaced by volume for each instance of replacement) at specific intervals, such as every few minutes, hours, or days. Alternatively, the anodic medium can be replaced when an optical transmission parameter property) of the anodic medium reaches a level indicative of the presence of planktonic microorganisms. For example, a turbidity analyzer (e.g., by laser scattering) or optical density instrument can be used to measure the relative turbidity or light transmission of the anodic medium. In a preferred embodiment, the anodic medium is replaced whenever the recirculating anodic medium reaches an optical density (e.g., $OD_{600}$) threshold e.g., above 0.05 units. Replacement of the anodic medium can then be stopped when the optical density value no longer exceeds the desired threshold level.

Preferably, anodic medium is removed directly after the anodic medium is subjected to a high flow rate pulse. In this case, the high flow rate pulse can be conducted either during recirculation of the anodic medium, or alternatively, during a momentary interruption of the recirculation condition for a time sufficient for the high flow rate pulse (and optionally, a simultaneous or subsequent removal of the medium used for the high flow rate pulse) to take place. The medium used in the high flow rate pulse can be the medium being recirculated or can be a separate medium (e.g., water, purified water, buffered water, or mineralized water) not in contact with the recirculated medium. In a particular embodiment, the pressure resulting from the high flow rate pulse is used to force the medium out of an outlet of the anodic chamber so that medium used in the high rate pulse is immediately ejected from the anodic chamber after the high flow rate pulse.

In order to establish a viable biofilm on the anode, the biofilm is subjected to a growth stage. The growth stage is achieved by incorporating one or more carbon-containing (i.e., organic) nutritive compounds (i.e., "nutritive carbon source") in the anodic liquid medium either during or after biofilm formation and a substantial absence of planktonic microorganisms have been achieved. The carbon-containing nutritive compounds are any compounds or materials that can be oxidatively degraded by exoelectrogenic microorganisms such that electrons and protons result from the degradation. The nutritive compounds can broadly include, for example, waste products (e.g., from sewage streams, industrial pollutants and byproducts, and foodstuffs), synthetic and natural plastics and polymers, and biological materials. Typically, the nutritive compounds are biodegradable.

In a first embodiment, the organic nutritive compound includes one or more carboxylic acid-containing compounds or materials. The carboxylic acid-containing compounds can contain one, two, three, or any number of carboxylic acid groups and/or their salts. Some examples of nutritive compounds containing one carboxylic acid group include acetic acid, propanoic acid, butyric acid, valeric acid, caproic acid, glycolic acid, caprylic acid, capric acid, myristic acid, oleic acid, palmitic acid, pyruvic acid, lactic acid, benzoic acid, and salts thereof, and combinations thereof. Some examples of nutritive compounds containing two carboxylic acid groups include oxalic acid, malonic acid, maleic acid, fumaric acid, succinic acid, glutaric acid, adipic acid, phthalic acid, terephthalic acid, and malic acid. Some examples of nutritive compounds containing three carboxylic acid groups include citric acid and the benzenetricarboxylic acids.

In a second embodiment, the organic nutritive compound includes one or more carbohydrate compounds or materials. The carbohydrate compounds or materials include, for example, monosaccharides, disaccharides, oligosaccharides, and polysaccharides (i.e., starch or fiber). Some examples of monosaccharides include glucose, fructose, galactose, xylose, and ribose. Some examples of disaccharides include sucrose, lactose, maltose, trehalose, and cellobiose. Some examples of trisaccharides include raffinose and maltotriose. The oligosaccharides are saccharide polymers containing a small number (typically three to ten) of saccharide monomers. They are also referred to as simple sugars. Some examples of oligosaccharides include fructooligosaccharides, inulin, galactooligosaccharides, and mannan-oligosaccharides. As used herein, polysaccharides refer to the class of sugar polymers containing more than ten monomer units, and more typically, at least 200 monomer units. Some examples of polysaccharides include starch, cellulose, chitin, dextran, xylan, mannan, chitosan, pectin, and pullulan.

In a third embodiment, the organic nutritive compound includes one or more lipid-containing substances, such as one or more fats, mono-, di-, or triglycerides, oils, fatty acids, lipoproteins, or liposaccharides.

In a fourth embodiment, the organic nutritive compound includes one or more amino acid-containing substances, such as one or more free amino acids, dipeptides, tripeptides, oligopeptides, or proteins.

In a fifth embodiment, the organic nutritive compound is a combination of organic nutritive compounds or materials. For example, the organic nutritive compound can be a combination of one or more carboxylic acid-containing compounds or materials and one or more carbohydrate compounds or materials.

In one embodiment, the growth stage of the biofilm is achieved by incorporating the one or more organic nutritive compounds in the anodic medium after biofilm formation on the anode, along with a substantial absence of planktonic microorganisms, have been established. For example, after a biofilm is known to be present along with a substantial absence of planktonic microorganisms, then the one or more nutritive compounds are incorporated into the anodic medium (e.g., by injection into a flowing, recirculating anodic medium) to begin the growth phase. In such an embodiment, it is preferable that, prior to addition of the one or more organic nutritive compounds, the anodic medium contain one or more non-organic (i.e., inorganic) compounds or materials that function to keep the microorganisms alive but not in a growth stage. The inorganic compounds typically include minerals and vitamins, such as, for example, suitable concentrations of alkali and alkaline halide salts (e.g., $KCl$, $MgCl_2$, and the like), phosphates, ammonium salts, and the like. The addition of organic nutritive compounds can take place directly after biofilm formation and a substantial absence of planktonic microorganisms have been established, or alternatively, after any suitable amount of time after such conditions have been established. For example, the addition of organic nutritive compounds can take place within 0-10, 0-3, 1-10 hours, 1-3 days, or 3-10 days after biofilm formation and a substantial absence of planktonic microorganisms have been established.

In another embodiment, the growth stage of the biofilm is achieved by incorporating the one or more organic nutritive compounds in the anodic medium during biofilm formation on the anode, e.g., before or while planktonic organisms are being removed.

The growth stage is preferably conducted by administration of an excess amount of the nutritive carbon source. An excess amount of nutritive carbon source, as used herein, is an amount exceeding the amount required for producing the maximum level of current achievable under the conditions (e.g., resistance, and other factors) provided by the MFC, such that the excess amount can be used by the microorganisms to grow and multiply in numbers. As further described below, an excess amount of nutritive carbon source can be advantageous by encouraging the biofilm microorganisms to store carbon internally during a subsequent state of famine.

The growth stage is preferably continued until an electrical current output of the MFC becomes level at a fixed resistance between the anode and cathode, after which time the organic nutritive compounds can be stopped for a suitable period of time, or periodically administered, in order to maintain a desired current or voltage level. For example, the growth stage may be considered complete when the MFC electrical output stabilizes to a voltage between 0.3-0.4 V at a 500 ohm load.

Preferably, after the growth stage described above, the microorganisms of the biofilm are further subjected to a starvation stage. The starvation stage serves two main purposes: i) to enrich the biofilm with organisms having internally stored carbon by eliminating those organisms that are incapable of internally storing carbon for their cellular maintenance and electricity production during the starvation stage, and ii) to enrich the biofilm with a higher proportion of exoelectrogenic microorganisms by weakening non-exoelectrogenic organisms and eliminating them from the biofilm. During the starvation stage, organisms that lack the ability to store carbon internally will weaken and be eliminated due to an absence of a food source for such organisms. Conversely, those organisms having an inclination for carbon storage will thrive under such conditions.

The starvation stage is conducted by lowering the administered amount of organic nutritive compound in the anodic medium to below the amount required for the microorganisms to produce the maximum achievable current under the conditions (e.g., resistance, and other factors) provided by the MFC. The amount of nutrient required to produce the maximum achievable current under conditions provided by the MFC is hereinafter referred to as the "nutrient threshold value". Preferably, the administered amount of organic nutritive compound (i.e., nutrient) during the starvation stage is no more than 50% of the amount required to attain the nutrient threshold value. More preferably, the administered amount of nutrient during the starvation stage is no more than 25%, or no more than 10%, or no more than 1%, of the amount required to attain the nutrient threshold value. In a particularly preferred embodiment, the administered amount of organic nutritive compound is substantially eliminated from the anodic medium. By being "substantially eliminated" from the anodic medium is meant that nutritive organic compounds are not administered in any amount, except that residual amounts of organic nutritive compounds (e.g., generally under 1% of threshold level) may be present. The starvation stage is conducted for a period of time until the biofilm is enriched in microorganisms capable of storing carbon internally. Enrichment of the biofilm with carbon-storing microorganisms is typically evidenced by maintenance of the voltage output of the MFC during the starvation stage. A decline of the voltage occurs when the carbon stores in the microorganisms become depleted to a level under the level required to maintain the voltage. Preferably, after the initial indication of a voltage decline, the starvation stage is ended by administration of an amount of organic nutrient sufficient to at least maintain the voltage of the MFC. However, the starvation stage can be ended before a voltage decline is observed, i.e., at a point in time for which it is known that a certain level of enrichment has occurred.

Preferably, after any of the stages described above, but more preferably after the starvation stage described above (and more preferably, with reinitiation of the supply of the organic nutritive compounds), the microorganisms of the biofilm are further subjected to a decreased electrical resistance stage. Lowering the resistance (i.e., load) across the anode and cathode increases the current flow between the two electrodes, and this in turn encourages the growth of exoelectrogenic organisms (i.e., further enrichment of the biofilm with exoelectrogenic organisms). The external resistance is typically controlled by use of a resistor box. The resistor box is preferably one which can be set to any suitable resistance, preferably within the range of 0-5000 ohms. The resistance can be reduced by any desirable or suitable amount, either in discrete amounts or gradually over a desired period of time. For example, in different embodiments, the load can be decreased to about 95%, or 90%, or 85%, or 80%, or 75%, or 70%, or 65%, or 60%, or 55%, or 50%, or 45%, or 40%, or 35%, or 30%, or 25%, or 20%, or 15%, or 10%, or 5% its original value.

The anode can be constructed of any electrically conductive material known in the art suitable for the purposes described herein and which can allow a biofilm to adhere and grow thereon. Some classes of electrode materials or a coating thereof include conductive metals (e.g., nickel, palladium, platinum, silver, gold, titanium, cobalt, tungsten, and their alloys), conductive polymers, or conductive carbon. Particularly preferred for the anode are electrodes based on conductive carbon. Typically, any elemental form of carbon is suitable as a conductive carbon material. Some examples of carbon electrodes include carbon fiber, carbon paper, carbon foam (e.g., reticulated vitreous carbon), carbon cloth, carbon felt, carbon wool, carbon granules, carbon brushes, graphite, or a combination thereof. The conductive carbon material can have any suitable physical characteristics, such as having a porous, non-porous, powderized, grainy, fibrous, brush, nanotextured, or patterned texture. The conductive carbon material can also be of a less typical form of carbon, such as carbon nanotubes (e.g., single or double walled) or fullerenes.

The cathode can be constructed of any suitable electrically conductive material, such as any of the materials described above for the anode. In one embodiment, the cathode is any of the gas cathodes known in the art (e.g., a Pt/air electrode). Typically, the gas cathode contains a side which is immersed in the anodic liquid and another side exposed to the gas, which is typically air. The side exposed to the gas typically includes a cathode diffusion layer (CDL) which permits gas to enter but prevents leakage of anodic fluid. In another embodiment, the cathode is any of the ferricyanide electrode systems known in the art. In yet another embodiment, the cathode is any biological system capable of accepting, utilizing, or transforming electrons.

For MFCs of the art, the ratio of the volume of the anode to the volume of the anode chamber (i.e., the "volume ratio") is typically within the range of 0.1 to 0.4. However, such small volume ratios are conducive to the growth of non-exoelectrogenic organisms. It has been found herein that use of higher volume ratios (i.e., greater than 0.4) advantageously encourage the growth of exoelectrogenic organisms and reduces the growth non-exoelectrogenic organisms. Accordingly, the method, as described herein, is preferably practiced by use of volume ratios of at least 0.5, more preferably at least 0.6, more preferably at least 0.7, more preferably at least 0.8, and even more preferably at least 0.9. Even more preferably, the volume ratio is approximately 1 (i.e., at or greater than 0.95), thereby attaining a dead volume of essentially zero in the anode chamber.

The spacing between the anode and cathode (i.e., the electrode spacing) can be any suitable length, typically in the range of 0 to 1 cm. Smaller electrode spacings (i.e., less than 1 cm) are generally preferred. For example, in different embodiments, the electrode spacing can be at about or less than 0.8 cm, or 0.5 cm, or 0.25 cm, or 0.1 cm, or 5 mm, or 4 mm, or 3 mm, or 2 mm, or 1 mm, or 0.5 mm.

The electrode surface area to volume ratio (specific surface area) for the anode can be any suitable value. Generally, higher specific surface areas improve the growth of exoelectrogenic organisms and increase power density during operation of MFC for electricity or hydrogen production. Accordingly, the specific surface area is preferably at least 1,000 $m^2/m^3$. More preferably, the specific surface area is at least 5,000, more preferably at least 10,000 $m^2/m^3$, more preferably at least 30,000 $m^2/m^3$, and even more preferably, at least 40,000 $m^2/m^3$. In other preferred embodiments, the specific surface area is at least about 45,000 or 50,000 $m^2/m^3$ (particularly for the case when a carbon felt anode is used). Any ranges of specific areas that can be created between any of the values set forth above are also contemplated herein.

Preferably, in order to maximize electrical output and provide an efficient system for electrical production, the level of oxygen in the anodic chamber is reduced, and preferably substantially reduced, so as to result in an appreciably anaerobic environment at the anode. Any method for removal and exclusion of oxygen at the anode can be used. In a preferred embodiment, nitrogen sparging of the anodic medium is employed to render the anodic medium substantially anaerobic.

The MFC described herein can have any suitable number of cathodes and anodes. For example, the MFC can be operated with one anode and more than one cathode, or one cathode and more than one anode, or an equivalent number of anodes and cathodes (e.g., two anodes and two cathodes, or three anodes and three cathodes). In addition, the MFC can function monolithically, or alternatively, in a stacked mode in which, for example, 2-500 MFC units are stacked in order to increase electrical power output.

In another aspect, the MFC described above, after having been processed by any one or more of the steps described above, is operated in order to generate electricity. For this purpose, the MFC can operate in, for example, a batch processing or continuous flow system. The MFC is typically operated within a mild temperature range of about 20 to 50° C. and normal pressure conditions (i.e., approximately 1 atm). However, if thermophilic or hyperthermophilic organisms are used, the operating temperature of the MFC can be higher (e.g., at about or greater than 50° C., or 60° C., or 70° C., or 80° C., or 90° C., or 100° C.). In other embodiments, the MFC can be operated under cooler conditions of less than 20° C., such as a temperature of about or less than 15° C., or 10° C., or 5° C., or 4° C., or 2° C. Operating temperatures of 0° C. or lower are possible depending on the salinity of the flowing medium.

The MFC can utilize any suitable nutrition source (i.e., fuel source) for the purpose of producing electricity. The nutrition source should contain one or more organic nutritive compounds or materials that are capable of being biologically degraded, as described above. The MFC can advantageously use waste products for fuel. Some examples of waste fuel sources include raw or processed municipal waste streams, industrial waste streams, food processing waste streams, and chemical waste streams (e.g., textile, polymer, additive, pesticide, solvent, surfactant, halohydrocarbon, or vinyl monomer chemical streams). Other feedstocks which can be supplied to the MFC, whether non-waste or waste, include, for example one or more alcohols (e.g., methanol or ethanol), carboxylic acids (e.g., acetic acid or acetate salts), carbohydrates, ethers (including polyethers), esters (including polyesters), amines, dioxins, cyanates, isocyanates, urethanes, and the like.

The electrical power output of the MFC described herein is typically above 250 $W/m^3$. Preferably, the electrical power output of the MFC is at or above 300 $W/m^3$, more preferably at or above 350 $W/m^3$ more preferably at or above 400 $W/m^3$, and even more preferably at or above 450 $W/m^3$. The MFC of the present invention can even attain an electrical power output of about 500 $W/m^3$ or greater.

In another aspect, the MFC described above, after having been processed by any one or more of the steps described above, is operated in order to produce hydrogen gas. In order to render the MFC capable of producing hydrogen gas, the MFC is preferably modified in the following manner: i) the cathode is preferably constructed of a hydrogen-producing material; ii) the cathode is preferably substantially deoxygenated; and iii) the cell potential of the MFC is preferably adjusted, by application of an external voltage, such that hydrogen can be produced at the cathode. Such a device is referred to herein as a microbial electrolysis cell (MEC). The hydrogen-producing material of the cathode can be any material capable of producing hydrogen from protons, including, for example, hydrogen-producing metals, such as typically platinum (Pt), palladium (Pd), nickel Ni), iron (Fe), copper (Cu), or an alloy thereof. Other possible hydrogen-producing materials include hydrogen-producing enzymes or microbes. Deoxygenation of the cathode can be conveniently achieved by, for example, nitrogen (or other inert gas) sparging of the cathodic medium and/or sealing of the cathodic chamber so as to prevent entry of air. The cell potential ($\Delta V$) is typically adjusted such that the MFC anode potential (typically around −0.3 V) is externally supplemented such that the potential difference between the anode and the cathode is at least about 0.41 V. For example, the anode can be externally assisted with a voltage of about 0.11 to 0.25 V or higher for this purpose, depending on the magnitude of the cathode overpotential. For hydrogen production, the anolyte and catholyte need not be separated by a cation-selective permeable membrane.

In another aspect, the MFC described above, after having been processed by any one or more of the steps described above, is operated in order to reductively process one or more compounds or materials. Typically, the one or more compounds or materials to be reductively processed are reducible species generally amenable to electrochemical reduction. More typically, the reducible species are electrochemically positive electron acceptors. When operated for this purpose, the MFC utilizes an anode as prepared above and a cathode in contact with the chemical species to be reduced. Operation of the MFC will then electrochemically reduce these species at the cathode. The reductive process is typically used for the breakdown and elimination of one or more chemical species that are environmentally malignant. The environmentally malignant species can be, for example, a pollutant, waste product, or toxin. However, the process can also be used for the processing of a chemical to produce a useful end product.

In one embodiment, the reducible species is a compound or material containing a nitrogen oxide N—O) bond. Such a compound is commonly a nitrate-containing species (i.e., "a nitrate" or "nitrate compound"). The nitrate compounds can include inorganic nitrate species (e.g., $NaNO_3$, $KNO_3$, $NH_4NO_3$, $Mg(NO_3)_2$, $AgNO_3$, $HNO_3$, and so on) as well as organonitrate species, such as tetramethylammonium nitrate. Other types of nitrogen oxide compounds that can be reduced include the nitrites, organonitro compounds, dinitrogen tetroxide, nitrosyl (nitroso) compounds, nitric oxide (NO), and nitrosonium species.

In another embodiment, the reducible species is a compound or material containing a halogen oxide bond. A common class of such compounds are the chlorine oxide class of compounds. A common subclass of chlorine oxide compounds are the perchlorates. The perchlorates include inorganic perchlorate species (e.g., $LiCl_4$, $NaClO_4$, $KClO_4$, $NH_4ClO_4$, $Mg(Cl_4)_2$, $AgClO_4$, $HClO_4$, and so on) as well as organoperchlorate species, such as tetramethylammonium perchlorate. Other subclasses of chlorine oxide compounds include the chlorates, chlorites, hypochlorites, and their acids. Other classes of halogen oxide compounds include the bromine oxide and iodine oxide classes of compounds. Some subclasses of bromine oxide compounds include the perbromates, bromates, bromites, hypobromites, and their acids. Some subclasses of iodine oxide compounds include the periodates, iodates, iodites, hypoiodites, and their acids.

In another embodiment, the reducible species is a compound or material containing one or more reducible metal species. A reducible metal species typically contains a metal atom having a positive oxidation state. The reductive method is particularly effective in reducing heavy metals, which are often harmful to the environment and in need of removal. Some examples of reducible metal species include Cr(VI) as found in chromates and dichromates, Mn(VII) as found in permanganates, Fe(III), Ni(III), Cu(II), Cu(I), Pd(II), Ag(I), Cd(II), Au(III), Au(I), Hg(I), Pb(II), and U(VI), which can be converted to the relatively insoluble U(III) species.

In yet another embodiment, the reducible species is a peroxide. The peroxide can be, for example, inorganic (e.g., hydrogen peroxide), or an organoperoxide, such as carbamide peroxide, dibenzoyl peroxide, and cumene hydroperoxide. The reducible species can also be, for example, an inorganic or organic disulfide compound or material.

The exoelectrogenic microorganisms (i.e., organisms) that form the biofilm can be any suitable microorganism. Without wishing to be bound by any theory, it is believed that nearly any type (e.g., domain, kingdom, phylum, class, order, family, genus, or species) of microorganism will contain, in some portion of its population, microorganisms capable of exhibiting exoelectrogenic behavior and capable of forming a biofilm. Accordingly, it is believed that the invention as described herein is not limited by the type of microorganism being used.

The microorganism can be, for example, eukaryotic or procaryotic, and either unicellular or multicellular. An example of a suitable unicellular eukaryotic microorganism is yeast. Other examples of unicellular eukaryotic microorganisms include the protists or protozoans, such as amoeba and paramecia. An example of multicellular eukaryotic microorganisms includes the *euglena*. Those algae capable of uptake of organic carbon (e.g., eukaryotic or procaryotic mixotrophic forms) are also contemplated herein. Procaryotic organisms are predominantly unicellular, and are divided into two domains: the bacteria and the archaea. The procaryotic organisms can also be broadly divided into four main groups according to their shape: the cocci, the bacilli, spirilla, and *vibrio*. The archaea include the extremophiles (e.g., as found in hot springs and lakes), and the non-extremophiles, as found in soil, the oceans, and marshland. The archaea also include the methanogens.

In one embodiment, the microorganisms considered herein are bacteria. Some examples of phyla of bacteria considered herein are the Acidobacteria, Actinobacteria, Aquificae, Bacteroidetes, Chlorobi, Chlamydiae/Verrucomicrobia, Chloroflexi, Chrysiogenetes, Cyanobacteria, Deferribacteres, Deinococcus-Thermus, Dictyoglomi, Fibrobacteres, Firmicutes, Fusobacteria, Gemmatimonadetes, Nitrospirae, Planctomyeetes, Proteobacteria ($\alpha$, $\beta$, $\gamma$, $\delta$ varieties), Spirochaetes, Synergistetes, Tenericutes, Thermodesulfobacteria, Thermotogae, or any combination thereof. Some particularly relevant families of bacteria being considered herein include Acidaminococcaceae, Acidobacteriaceae, Aeromonadaceae, Alteromonadaceae, Clostridiaceae, Comamonadaceae, Desulfobulbaceae, Desulfuromonadaceae, Enterobacteriaceae, Geobacteraceae, Pasturellaceae, Pelobacteraceae, Pseudomonadaceae, Rhodocyclaceae, and Shewanellaceae. Any combination of bacteria containing at least one of the above families of bacteria are also contemplated herein.

In a particular embodiment, the biofilm or inoculum from which the biofilm is derived includes one or more classes of bacteria from the phylum Firmicutes. Some particular classes of Firmicutes bacteria being considered herein are Bacilli, Clostridia, and Mollicutes. A particular order of Clostridia being considered herein is Clostridiales. Some particular families of Clostridiales being considered herein are Acidaminococcaceae, Clostridaceae, and Veillonellaceac. Some particular genera of Acidaminococcaea or Veillonellaceae being considered herein are *Acetonema, Acidaminococcus, Allisonella, Anaeroarcus, Anaeroglobus, Anaeromusa, Anaerosinus, Anaerovibrio, Centipeda, Dendrosporobacter, Dialister, Megamonas, Megasphaera, Mitsuokella, Pectinatus, Pelosinus, Phascolarctobacterium, Propionispira, Propionispora, Quinella, Schwartzia, Selenomonas, Sporomusa, Sporotalea, Succiniclasticum, Succinispira, Thermosinus, Veillonella,* and *Zynophilus*.

In another particular embodiment, the biofilm or inoculum from which the biofilm is derived includes one or more classes of bacteria from the phlyum Proteobacteria.

A particular class of Proteobacteria being considered herein is Alpha Proteobacteria. Some particular orders of Alpha Proteobacteria being considered herein are Caulobacterales (e.g., the family Caulobacteraceae, or *Caulobacter* sp.), Kordiimonadales, Parvularculales, Rhizobiales (e.g., the family Rhizobiaceae, or *Rhizobium* sp.), Rhodobacterales, Rhodospirillales (e.g., the family Acetobacteraceae, or *Acetobacter* sp.), Rickettsiales (e.g., the family Rickettsiaceae, or *Rickettsia* sp.), and Sphingomonadales (e.g., the family Sphingomonadaceae, or *Sphingomonas* sp.), wherein "sp." or "spp." as used herein both indicate one or more species of the indicated genus.

Another particular class of Proteobacteria being considered herein is Beta Proteobacteria. Some particular orders of Beta Proteobacteria being considered herein are Burkholderiales, Hydrogenophilales, Methylophilales, Neisseriales (e.g., the family Neisseriaceae, or *Neisseria* sp.), Nitrosomonadales, Rhodocyclales, and Procabacteriales. A particular family of Burkholderiales being considered herein is Comamonadaceae. Some particular genera of Comamonadaceae being considered herein are *Acidovorax, Aquabacterium, Brachymonas, Comamonas, Curvibacter, Delftia, Hydrogenophaga, Ideonella, Leptothrix, Malikia, Pelomonas, Polaromonas, Rhodoferax, Roseateles, Sphaerotilus, Tepidimonas, Thiomonas,* and *Variovorax*. A particular family of Rhodocyclales being considered herein is Rhodocyclaceae. A particular genus of Rhodocyclaceae being considered herein is *Azospira*.

Another particular class of Proteobacteria being considered herein is Gamma Proteobacteria. Some particular orders of Gamma Proteobacteria being considered herein are Acidithiobacillales, Aeromonadales, Alteromonadales, Cardiobacteriales, Chromatiales (purple sulfur bacteria), Enterobacteriales (e.g., the family Enterobacteriaceae, such as the genera *Escherichia* or *Salmonella*), Legionellales (e.g., the family Legionellaceae, or *Legionella* sp.), Methylococcales, Oceanospirillales, Pasteurellales (e.g., the family Pasteurellaceae, or *Haemophilus* sp.), Pseudomonadales, Thiotrichales (e.g., Thiomargarita), Vibrionales (e.g., the family Vibrionaceae, or *Vibrio* sp.), Xanthomonadales (e.g., the family Xanthomonadaceae, or *Xanthomonas* sp.). A particular family of Aeromonadales being considered herein is Pseudomonadaceae. A particular genus of Pseudomonadaceae being considered herein is *Pseudomonas* (e.g., *P. aeruginosa*). Some particular families of Alteromonadales being considered herein are Shewanellaceae and Pseudoalteromonas. A particular genus of Shewanellaceae being considered herein is Shewanella (e.g., *S. putrefaciens*).

Another particular class of Proteobacteria being considered herein is Delta Proteobacteria. Some particular orders of Delta Proteobacteria being considered herein are Aeromonadales, Bdellovibrionales (e.g., the family Bdellovibrionaceae, or *Bdellovibrio* sp.), Desulfobacterales, Desulfovibrionales, Desulfurellales, Desulfarcales, Desulfuromonadales, Myxococcales (Myxobacteria), and Syntrophobacterales. A particular family of Aeromonadales being considered herein is Aeromonadaceae. A particular genus of Aeromonadaceae being considered herein is *Aeromonas*. Some particular families of Desulfeuromonadales being considered herein are Desulfuromonadaceae, Pelobacteraceae, and Geobacteraceae. A particular genus of Desulfuromonadaceae being considered herein is Desulfuromonas. A particular genus of Geobacteraceae being considered herein is Geobacter (e.g., *Geobacter sulfurreducens* and *Geobacter metallireducens*). A particular family of Desulfobacterales being considered herein is Desulfobulbaceae. A particular genus of Desulfobulbaceae being considered herein is Desulfobulbus.

Another particular class of Proteobacteria being considered herein is Epsilon Proteobacteria. Some particular orders of Epsilon Proteobacteria being considered herein are Campylobacterales (e.g., the family Helicobacteraceae, or *Helicobacter* sp.) and Nautiliales.

In another particular embodiment, the biofilm or inoculum from which the biofilm is derived includes one or more classes of bacteria from the phlyum Acidobacteria. A particular order of Acidobacteria being considered herein is Acidobacteriales. A particular family of Acidobacteriales being considered herein is Acidobacteriaceae. Some particular genera of Acidobacteriaceae being considered herein are Acidobacterium, Geothrix, Holophaga, and Chloracidobacterium.

In another embodiment, the microorganisms considered herein are archaea. Some examples of phyla of archaea considered herein are the Crenarchaeota, Euryarchaeota, Korarchaeota, and Nanoarchaeota. Some particular classes of Euryarchaeota being considered herein are Methanomicrobia and Methanobacteria. Some particular orders of Methanomicrobia being considered herein are Methanosarcinales and Methanomicrobiales. A particular order of Methanobacteria being considered herein is Methanobacteriales. Some particular families of Methanosarcinales being considered herein are Methanosaetaceae and Methanosarcinaceae. Some particular families of Methanomicrobiales being considered herein are Methanocorpusculaceae, Methanomicrobiaceae, and Methanospirillaceae. A particular family of Methanobacteriales being considered herein is Methanobacteriaceae.

Examples have been set forth below for the purpose of illustration and to describe certain specific embodiments of the invention. However, the scope of this invention is not to be in any way limited by the examples set forth herein.

EXAMPLE 1

General Procedure

The enrichment strategy selected for the development of a biofilm-forming exoelectrogenic biocatalyst was a combination of improved anode design and specific operating modes. The features of the design included: a compact anode with negligible electrode spacing, a high anode electrode surface to volume ratio and a flow-through design with forced flow to enable removal of planktonic cells (FIG. 1). The features of the operating modes were as follows: mode I. growth with electrode as the sole electron acceptor, mode II: carbon starvation mode and, mode III: step-wise reduction of external load.

A compact anode filled with carbon felt with minimal dead volume (i.e., a volume ratio of nearly 1) provided a high surface area for exoelectrogen growth. A flow-through design allowed easy removal of non-biofilm forming organisms via periodic replenishment of the anodic fluid. A forced flow-through anode enabled removal of mediators and organisms attached to the biofilm or electrode via electrostatic non-covalent linkages. The overall design and enrichment process was designed to promote growth of biofilm-forming, exoelectrogenic organisms in the anode via elimination of mediators and planktonic organisms. While the goal was to enrich organisms capable of direct electron transfer, the concentration of mediators was not explicitly measured. The criterion used for assessing whether the current production was primarily non-mediator-based was the time it took to resume the electricity production after replacement of the medium. The electricity production resumed immediately (e.g., within 10-15 minutes) after initiating recirculation of freshly added anaerobic media, demonstrating that the electricity production was primarily due to direct electron transfer. In contrast, typical planktonic and mediator-based MFCs of the prior art are known to take a much longer period of time, typically at least 30 minutes, and up to perhaps 2 hours in some cases, to resume electricity production.

The first mode of operation of the MFC was growth of the organisms in the presence of an excess carbon source but with the electrode as the sole electron acceptor. This was followed by a carbon limitation or starvation mode. In this mode, no new carbon source was added. The organisms were allowed to consume residual carbon accumulated in mode I and any carbon stored internally by the cells. In mode III, the external resistance was reduced step-wise to increase the current flow to the cathode, enabling further enrichment of exoelectrogenic organisms.

Figure 2:
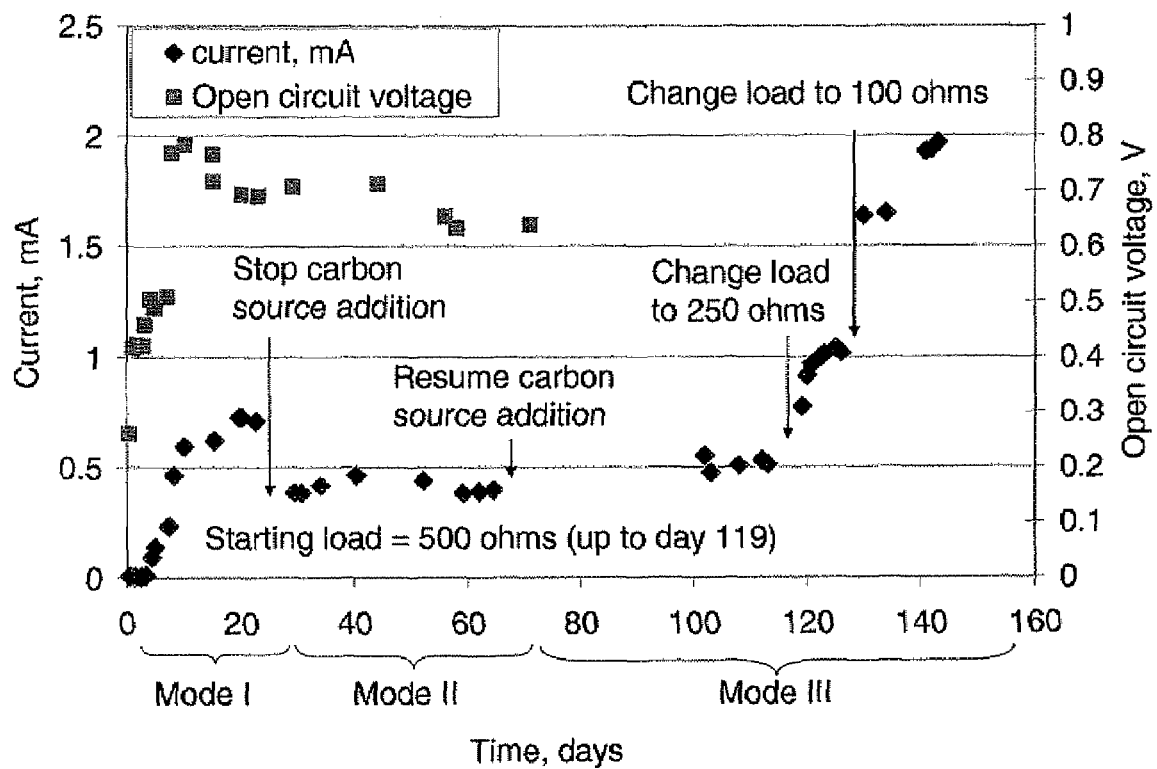
FIG. 2 Graph showing increase in current and open circuit voltage during enrichment of the anode biocatalyst with mixed carbon source as the energy source.

MFC with glucose, lactate and cellulose as the carbon source (MFC-A). During the first 28 days, a mixed carbon source was added to the nutrient medium every time the anode medium was replaced. The carbon source added was in excess of the amount of the electricity produced by the cell as measured by the voltage output. It was observed that the electricity production continued even after depletion of the carbon source in the nutrient medium, indicating that part of the carbon added was being stored internally by the cells. After the initial growth period of 28 days (FIG. 2), a carbon starvation mode was initiated (mode II). At the end of 28 days, the voltage output was 0.35 V at a 500 ohm load. The amount of cellulose added during the mode I was sufficient to produce electricity for 14 days assuming 100% columbic efficiency. The MFC was operated in mode II for 44 days, during which time the voltage output remained steady at about 0.2V (~0.4 mA) (FIG. 2). On the 45th day, or 73 days since start up, current production decreased substantially and carbon source addition was re-initiated. A mixture of glucose and lactate was used beginning day 73 to eliminate the inhomogeneity introduced by distribution of an insoluble cellulose substrate, During the enrichment process, removal of free-floating cells was continued as described previously. The purpose of mode 2 of the enrichment process was two-fold: first, to enrich organisms capable of producing electricity from internally stored carbon, and second, to weaken non-exoelectrogenic organisms and remove them from the consortium.

Further enrichment of the exoelectrogenic consortium was achieved by reducing the resistance on the MFC (mode III). On day 119, the load was dropped from 500 ohms to 250 ohms and then to 100 ohms on day 130. The goal was to provide additional electron withdrawal capacity, so the anode consortium can be further enriched in exoelectrogenic organisms. The current output increased during this period as seen from FIG. 2 corresponding to the reduced load.

The combination of the three different modes of operation and the use of the compact anode design was expected to result in enrichment of a biofilm-forming exoelectrogenic microbial community. The maximum power density of the MFC using glucose plus lactate as the carbon source (0.2 g/L, each) and using a ferricyanide cathode system, was 3200 mW/m$^2$. The power output of the MFC using various cathode systems has been reported elsewhere (see, for example, Bond, P. L., et al., *Applied and Environmental Microbiology*, 66, 3842-3849 (2000)). An MFC using acetate using a similar enrichment procedure resulted in a microbial consortium which yielded power density on the same order as the mixed carbon MFC (data not shown).

MFC with glucose and lactate as the carbon source (MFC-B). A second generation MFC was started using inoculum from the mixed carbon MFC on day 112. This MFC was operated initially at a load of 500 ohms, followed by step-wise reduction of the load to 50 ohms. The carbon source was glucose and lactate (0.2 g/L each). No cellulose was added in this MFC. Additionally, the carbon source was fed to the MFC-B anode in a continuous manner via a syringe pump, as opposed to a fed-batch mode of addition for the MFC-A. This further helps in reducing growth of non-exoelectrogenic organisms due to the lower availability of the substrate. In the MFC-B, the maximum power density was measured to be 5160 mW/m$^2$ (490 W/m$^3$ net anode volume). The coulombic efficiency of the MFC using 0.2 g/L glucose and lactate (each) was measured to be 64%.

EXAMPLE 2

Microbial Fuel Cell Construction

Figure 1B:
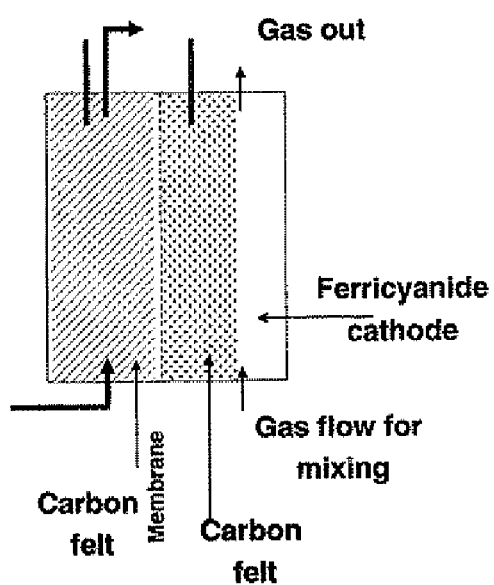
Figure 1C:
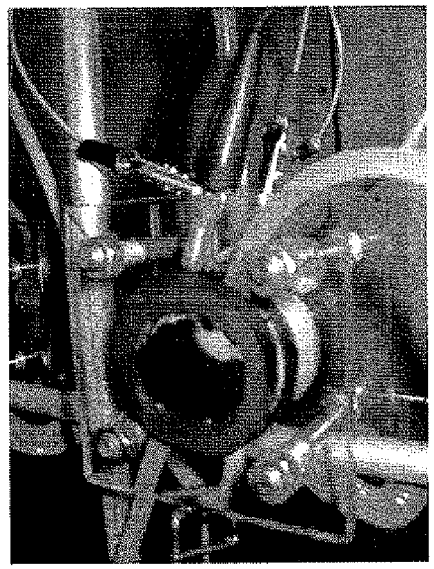

The MFC used in this study consisted of an anode chamber (4 cm diameter×1.27 cm thickness) containing carbon felt as the electrode material and a platinum-coated carbon as the cathode (Pt/C air-cathode) separated by a Nafion-115 membrane (FIG. 1A). The MFC chamber was made up of a 4 cm diameter PVC pipe, enclosed within two Lexan end plates, bolted together with metal bolts. The liquid flow through the anode was directed upwards through the carbon felt. A gold wire was used as a current collector for the air-cathode and a graphite rod was used for the anode. The Pt/C air-cathode was used during biocatalyst enrichment, while a ferricyanide-cathode (FIGS. 1B, C) was used for determining the maximum power density. The electrode for the ferricyanide cathode was also made using a pipe (4 cm diameter×2.54 cm thick) with carbon felt as the electrode material (2.54 cm×2.54 cm×0.625 cm). The felt was suspended by a carbon rod in a way that the felt surface was in firm contact with the Nafion membrane. The cathode chamber for the ferricyanide-cathode was sparged with air to mix the contents.

EXAMPLE 3

Establishment of a Biofilm on the Anode

The nutrient medium (Medium AC-1) used for enrichment consisted of 975 mL of a sterile mineral solution and 12.5 mL, each of filter sterilized Wolfe's mineral solution and vitamin solution (Gorby, Y. A., et al., *PNAS*, 103, 11358-11363 (2006)). The mineral solution was made up of 0.31 g $NH_4Cl$, 0.13 g KCl, 4.97 g $NaH_2PO_4.H_2O$, and 2.75 g $Na_2HPO_4.H_2O$ per liter of nanopure water (see, for example, Liu, H. et al., *Environ. Sci, Technol.*, 38, 4040-4046 (2004)), which was adjusted to a pH of 7.0 with 1N NaOH prior to sterilization. The nutrient medium AC-1 (200 ml) was placed in a glass bottle reservoir (anode liquid reservoir) and recirculated through the anode chamber at 4-7 mL/min (FIG. 1A). The medium was deaerated with nitrogen to remove the dissolved oxygen.

The anode chamber of the MFCs was inoculated with a 1 mL sample of anaerobic digester slurry collected from a Knoxville municipal wastewater treatment plant. The inoculum was added directly into the flow line entering the anode chamber, and carried into the anode chamber by the deaerated recirculating medium. During the enrichment process, the recirculating medium was replaced when the $OD_{600}$ increased above 0.05 units. This was approximately every 3 days. Beginning on day 64, 48 mL of fresh deaerated nutrient medium (3× of the anode volume) was also used to flush out planktonic bacteria from the anode chamber using forced flow through the chamber. A syringe was used to pull fresh deaerated medium placed in the anaerobic chamber from the anode chamber. The flushing procedure was carried out at the same frequency as that of the anode medium replacement, beginning day 64 for the rest of the enrichment period. The recirculating medium consisted of planktonic bacteria either growing in the anode chamber of the MFC or in the reservoir itself. The enrichment process was targeted to obtain exoelectrogenic biofilm-forming organisms via removal of free-floating cells and any mediators and mediator-based organisms growing in the MFCs.

EXAMPLE 4

Growth Stage and Enrichment of the Anodic Biofilm

Enrichment of the MFC-A anode biocatalyst in the presence and absence of a carbon source. During the start-up of the MFC, a mixed carbon source containing 0.2 g/L glucose, 0.2 g/L lactate, and 0.05 g/L cellulose (final concentration in recirculation medium) was added to the anode solution in a fed-batch manner. The cellulose was prepared by treating crystalline cellulose (Avicel, FMC, PH105) via a phosphoric acid swelling method (see, for example, Zhang, Y.-H. P., et al., *Biomacromolecules*, 7, 644-648 (2006)). The addition of the carbon source was continued until day 28, at which point the MFC output had stabilized between 0.3 and 0.4 V at a 500 ohm load. Mode II was initiated at that point. No external carbon source was added after day 28, until day 72, to allow selection of organisms capable of either using residual cellulose (remaining from the addition during the first 28 days) or those capable of storing carbon internally and then using it subsequently for its maintenance needs. The amount of cellulose added was sufficient for current production for 14 days, based on the voltage output of 0.2 V at a 500 ohm load. Thus, the second phase of enrichment was essentially targeted to enrich the MFC with organisms capable of storing carbon internally, in a carbon starvation mode.

Addition of the carbon source was restarted on day 73, when a decline in the voltage output was observed. The carbon source added, beginning day 73, contained a mixture of 0.2 g/L glucose and 0.2 g/L lactate, but no cellulose. The cellulose was excluded to prevent inhomogeniety within the anode chamber when making power density and coulombic efficiency measurements. Glucose and lactate were added into the aqueous anode medium in the reservoir, which was continuously recirculated through the anode chamber at a flow rate of 3-7 mL/min.

Further enrichment of microbial consortia. A new MFC (MFC-B) was processed using inoculum collected from the mixed carbon MFC (MFC-A) on day 113. The carbon source used in the MFC-B was a mixture of glucose and lactate, each at a concentration of 0.2 g/L. The operation of the MFC-B was similar to MFC-A in regards to the media replacement. However, the addition of the carbon source was changed from a fed-batch mode to a continuous mode of addition, beginning day 4. The rate of addition of glucose and lactate was, for each, 0.2 g/L-day. The substrates were added via a syringe pump directly into the flow line entering the MEC. The starting load on the MFC-B was 250 ohms. The voltage output reached 0.3 V in three days, indicating rapid growth of the biocatalyst, as compared to MFC-A. The load was reduced to 100 ohms on day 4 and then to 50 ohms on day 5, at which it was operated for the next five months.

EXAMPLE 5

Power Density Analysis

The power density analysis for both MFCs was conducted by feeding the carbon source in a fed-batch manner. The nutrient medium was completely replaced prior to every analysis, followed by addition of 0.2 g/L of the carbon source into the medium (glucose and lactate, each). A 200 mM potassium ferricyanide in 100 mM potassium phosphate buffer was used as the catholyte to determine the power density. The analysis was conducted 60 minutes after addition of the carbon source to allow the voltage output to stabilize. A variable resistor ranging from 0-5000 ohms was used and the voltage was recorded by a Fluke multimeter Model 83. The resistance sweep was conducted at an interval of 5 minutes. The maximum power density was confirmed by operating the MFC at the particular resistance for at least one hour, following the power density analysis. Multiple measurements of the voltage output at the resistance exhibiting maximum power density were made on different days to determine reproducibility of the power density curve. The results were always found to be within a 10% standard deviation. The power density analysis for MFC-B was also conducted using a fed-batch mode of addition of the carbon source (instead of the continuous mode of addition, in which the MFC-B was operated), in order to allow a comparison of the maximum power density with MFC-A.

EXAMPLE 6

Biofilm Characterization 16S clone library. Microbial samples were collected from the MFC-A anode on day 113, 126, 133 and 136, by dislodging the cells from the electrode using a hypodermic needle, followed by withdrawal of the cells using a syringe from the exit of the MFC anode. Genomic DNA was isolated using the standard freeze-thaw procedure, followed by phenol-chloroform extraction (see Bond, P. L., et al., *Applied and Environmental Microbiology*, 66, 3842-3849 (2000)). The 16S rDNA analysis was conducted as follows: The genomic DNA was amplified using GoTaq Flexi DNA polymerase (Promega, Madison, Wis.) and Bacteria-specific primers targeted to *Escherichia coli* 16S rRNA positions 8-27 (5'-AGA GTT TGA TCC TGG CTC AG-3' (SEQ ID NO: 1)) and 1510 to 1492 (5'-GGT TAC CTT TTA CGA CTT-3' (SEQ ID NO: 2)). The resulting in a PCR product of approximately 1.5 kb contained essentially the complete 16S rRNA gene. PCR products were purified from UltraPure™ Agarose (Invitrogen, Carlsbad, Calif.) using QIAquick Gel Extraction kit (Quagen Inc, Valencia, Calif.). PCR products were ligated in pCR 2.1-TOPO vectors (Invitrogen), transformed into TOP10 chemically competent *E. coli*, and plated onto LB agar containing 50 μg/ml kanamycin and X-gal. Transformants were incubated overnight at 37° C., and 96 white colonies were selected and transferred to 10 mM Tris-HCl buffer. The plasmid DNA released from the cells by heating to 95° C. was amplified by rolling circle amplification (RCA) of TempliPhi method that utilized bacteriophage 129 DNA polymerase (Amersham Biosciences, Piscataway, N.J.). The plasmid DNA was then sequenced using the BigDye Terminator v3.1 Cycle Sequencing kit and TA Forward primer with priming site on the plasmid. Sequences were determined by resolving the sequence reactions on an Applied Biosystems 3730 automated sequencer.

Multiple sequences were initially aligned against the most similar sequences in the Ribosomal Database Project II (RDP II) and assigned to a set of hierarchical taxa using a Naïve Bayesian rRNA classifier version 1.0.

Orientation of the sequences was checked using program OrientationChecker v.1.0. Sequences with unknown orientation were omitted from further analyses. Clone libraries were checked for the presence of chimeric sequences using a program Bellerophon (see Huber, T., et al., *Bioinformatics*, 20, 2317-2319 (2004)). Putative chimeras were excluded from analyses. To determine the clone library coverage for each sample, statistical analyses were performed using DOTUR (see Schloss, P. D., et al., *Appl. Environ. Microbiol*, 71, 1501-1506 (2005)). Closest relatives were retrieved from NCBI Database following BLAST search (see Altschul, S. F., et al. *J. Mol. Biol.*, 215, 403-410 (1990)). Similar sampling and analysis was done for samples from MFC-B and MFC-C collected on days 65 and day 162, respectively. Up to 96 colonies were cloned and sequenced for each of the samples collected from the MFCs.

DGGE analysis. DGGE analysis focused on the V3 region of the 16S rDNA gene which was amplified by nested PCR using separate primers to target both Bacterial and Archaeal sequences. For bacteria, the majority of the 16S rDNA gene was initially amplified from genomic DNA, using the same set of primers as above (Muyzer et al., 1995), employing Phusion DNA polymerase (Finnzymes) in a 50 μl reaction volume. In the nested amplification, primers 518R (ATTAC-CGCGGCTGCTGG (SEQ ID NO: 3)) and GC-341F (CGC-C CGCCGCGCGCGGCGGGCGGGGCGGGGGCACGG-GGGGACTCCTACGGGA GGCAGCAG (SEQ ID NO: 4)), containing the GC clamp, were used. To examine the benefits of the nested approach, the V3 region was also directly amplified from the genomic templates using primers 51 S8R and GC-341F, directly. For targeting Archaea, the initial amplification used primers A46F:

(C/T)TAAGCCATGC(G/A)AGT (SEQ ID NO: 5) and A1100r: (T/C)GGGTCTCGCTCGTT(G/A)CC (SEQ ID NO: 6), while nested amplification used primers A340F: CCCTACQGGG(C/T)GCA(G/C)CAG (SEQ ID NO: 7) and A519R: TTACCGCGGC(G/T)GCTG (Ovreas L., et al., *Appl Env Microbiol*, 63, 3367-3373 (1997) (SEQ ID NO: 8)).

The products of the PCR reaction were then mixed with 10 µl of DNA loading buffer and loaded onto a 10% polyacrylamide gel (37.5:1, acrylamide/bisacrylamide) prepared with a denaturing gradient of 35-65% (100% denaturing gradient corresponds to 7 M urea and 40% formamide (Sigma)). Gel electrophoresis was performed at 60° C., for 20 h at 120V. The gel was subsequently stained in 1×TAE buffer containing 1:1000 dilution of Cybrgreen I (Invitrogen) for an hour before being photographed and bands excised on a blue light transilluminator.

Figure 4:
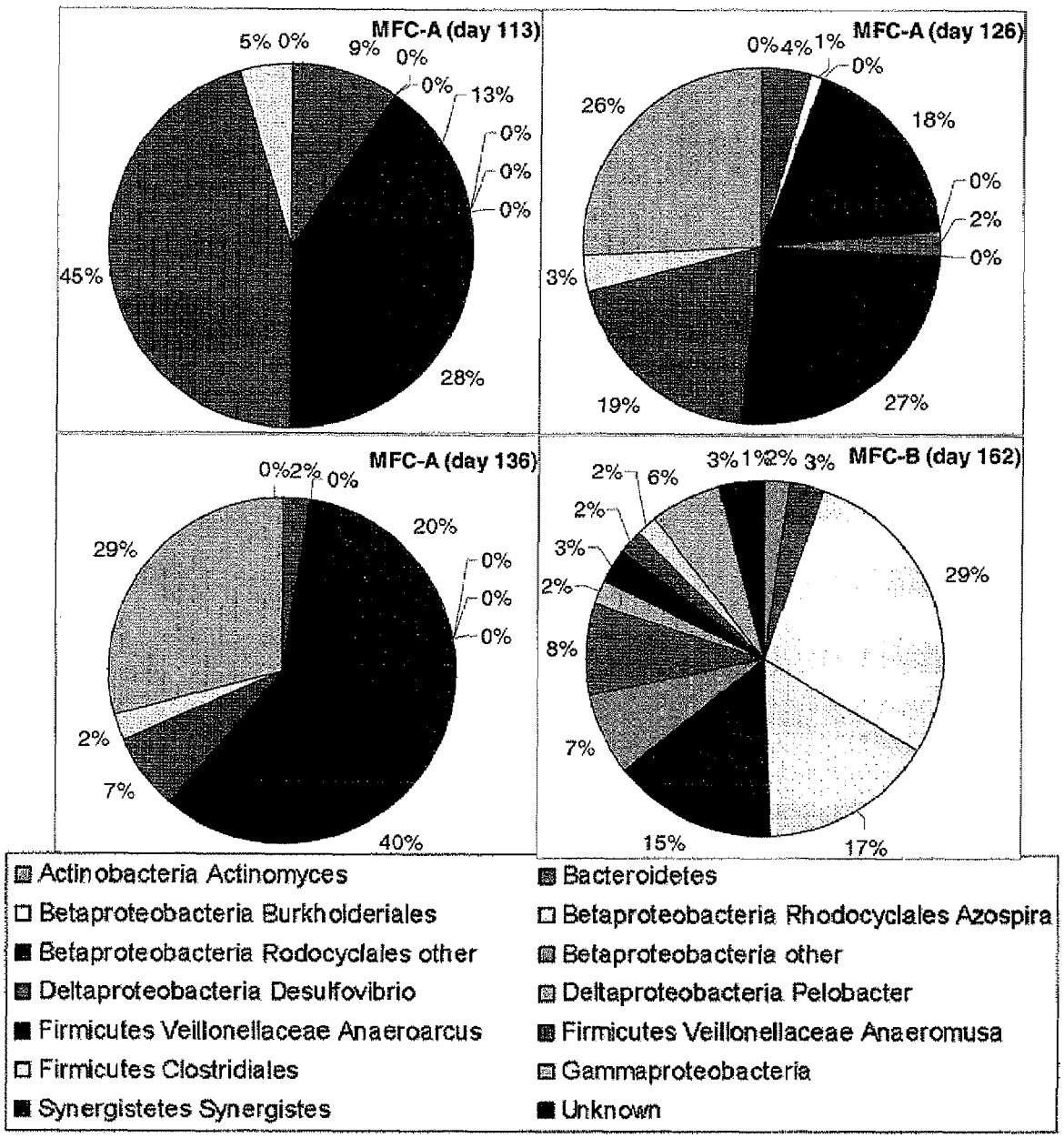
FIG. 4 Pie charts showing distribution of microbial consortium from MFC anode. Clockwise from top left: a) Consortium from MFC-A sampled on day 113, b) Consortium from MFC-A sampled on day 126, c) Consortium from MFC-A sampled on day 136, d) Consortium from MFC-C sampled on day 162.

Samples taken on day 126 and 136 showed a population distribution which was similar at the family level, although a few changes were observed at the genus level (top right and bottom left pie charts in FIG. 4, i.e., MFC-A, day 126 and 136, respectively). The dominant genus in the first sample (day 113) was Anaeroarcus, with Anaeromusa being the second dominant, which subsequently became the dominant genus as observed from the clone-libraries of samples from day 126 and 136.

Figure 5:
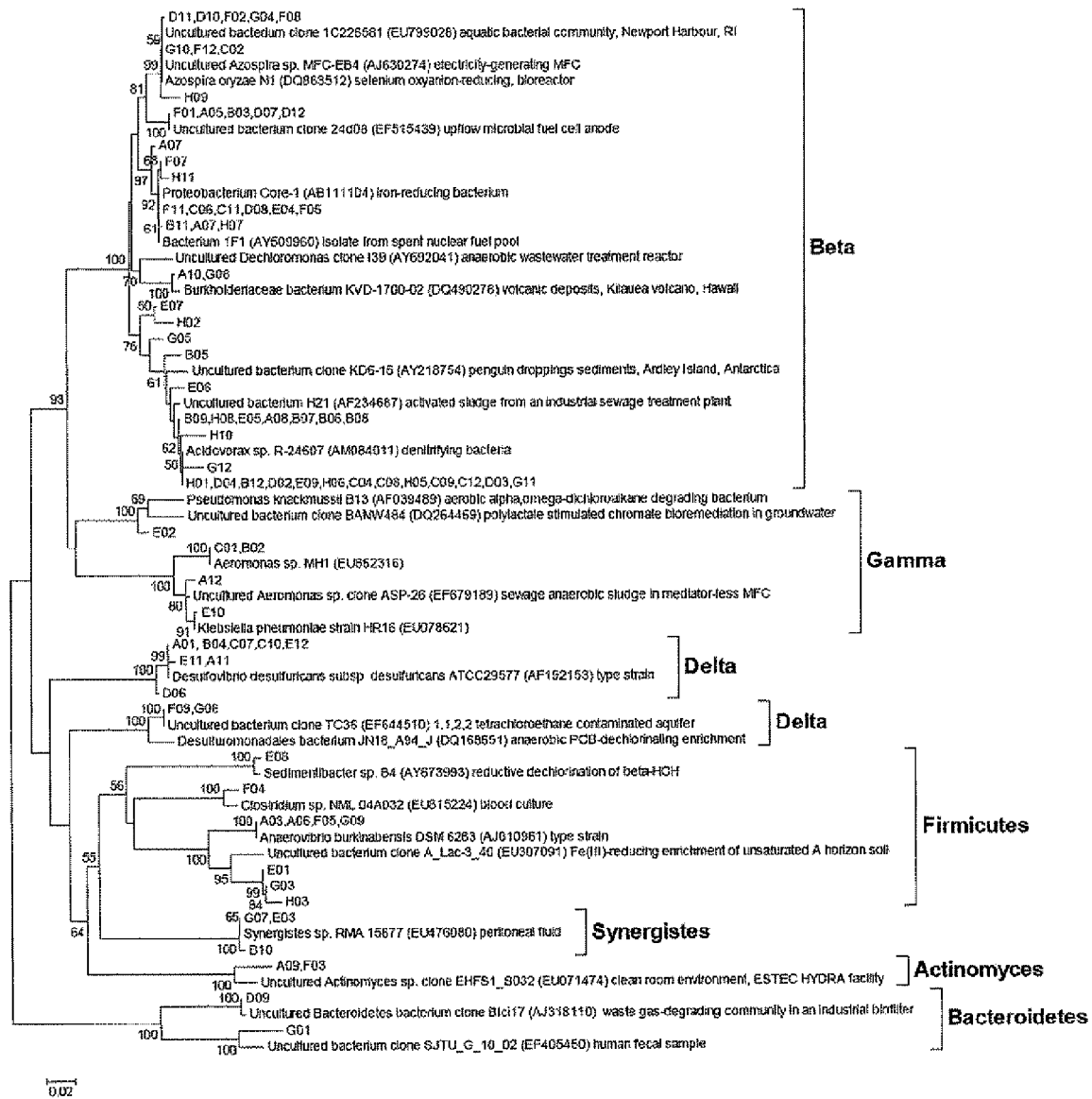
FIG. 5 Phylogenetic tree of the MFC-C consortium enriched using glucose and lactate as carbon source (day 162).

Analysis of the microbial population from 2nd generation MFC (MFC-B) revealed a significant change in the distribution of the population (bottom right pie chart in FIG. 4, i.e., MFC-B day 162). *Acidovorax* sp. became the dominant genus in this consortia and the population of *Anaeroarcus* sp. and *Anaeromusa* sp. was reduced to 7%. Table 1 below presents the data contained in the pie charts of FIG. 4 in tabular form. FIG. 5 shows a phylogenetic tree for the sample from MFC-B.

TABLE 1

Distribution of microbial population in the consortia from MFC-A and MFC-B

| Class | Order/Family | Genus | MFC-A, day 113 | MFC-A, day 126 | MFC-A, day 133 | MFC-B, day 162 |
|---|---|---|---|---|---|---|
| Actinobacteria | Actinomyces | | | | | 3.1% |
| Bacteroidetes | | | 9.4% | 6.3% | 1.6% | 4.7% |
| Betaproteobacteria | Burkholderiales | | | | 1.6% | 42.2% |
| Betaproteobacteria | Rhodocyclales | Azospira | | | | 23.4% |
| Betaproteobacteria | Rhodocyclales | other | 12.5% | 25.0% | 12.5% | 21.9% |
| Betaproteobacteria | other | | | | | 10.9% |
| Deltaproteobacteria | Desulfovibrionales | | | 3.1% | | 12.5% |
| Deltaproteobacteria | Pelobacter | | | | | 3.1% |
| Firmicutes | Veillonellaceae | Anaeroarcus | 28.1% | 35.9% | 25.0% | 4.7% |
| Firmicutes | Veillonellaceae | Anaeromusa | 45.3% | 26.6% | 4.7% | 3.1% |
| Firmicutes | Clostridiales | | 4.7% | 4.7% | 1.6% | 3.1% |
| Gammaproteobacteria | | | | 35.9% | 18.8% | 9.4% |
| Synergistetes | Synergistes | | | | | 4.7% |
| Unknown | | | | | | 1.6% |

The excised gel fragments were left overnight to elute in 30 µl of sterile water. One µl was used as a PCR reaction template as described above using primers 518:R and 341F without the GC clamp (ACTCCTACGGGAGGCAGCAG (SEQ ID NO: 9)), or ARCH340F and ARCH519R without the CC clamp, as appropriate. Fragment termini were adenylated by addition of 0.5 µl of Taq Polymerase (Invitrogen) and incubation at 72° C. for 20 min. They were subsequently cloned in either pCR3.1 TOPO (Invitrogen) or pGEM-T Easy (Promega) vectors according to the manufacturers' protocols. Positive clones were identified by PCR with universal primers M13F and M13R (Fermentas) and plasmid DNA prepared using a Qiagen plasmid miniprep kit. Sequencing was performed from the M13F primer at the Genomics Core Laboratory, MRC Clinical Sciences Centre, Hammersmith Hospital, London, UK. Sequence analysis was performed using the programmes Bioedit, AligmX (Invitrogen) and Blast (http://blast.ncbi.nlm.nih.gov/Blast.cgi).

Results. The 16S rRNA analysis of the anodic microbial consortium from the mixed carbon source MFC via a bacterial primer-based clone-library method revealed the following distribution of the population: 69% Firmicutes, 12% g-Proteobacteria, 11% b-Proteobacteria, and 8% Bacteroidetes (top left pie chart in FIG. 4, i.e., MFC-A day 113). The bacterial community included 34% *Anaeroarcus* spp., 29% *Anaeromusa* spp., 6% *Aeromonas* spp., 5% *Azospira* spp., as welt as 20 other strains from various genera. Changes in the microbial community were tracked by sampling at three different time events (day 113, 126 and 136).

The DGGE analysis of the samples collected between day 113 to day 136 from MFC-A revealed bacterial species similar to that observed via thee clone-library analysis. In addition to use of bacterial primers, archaea primers were also used for amplifying the DGGE fragments. Several archaea species were identified. These belonged to Methanosarcinales, Methanomicrobiales and other Methanobacteriaceae genera.

Little is known about the two most dominant genera, *Anaeroarcus* sp. and *Anaeromusa* sp., found in the clone-library obtained from the samples from the mixed carbon MFC. Both of these genera belong to the family Veillonellaceae, which have been described as amino-acid utilizing organisms (see Strompl, C. et al., *International Journal of Systematic Bacteriology*, 49, 1861-1872 (1999); and Baena, S., et al., *International Journal of Systematic Bacteriology*, 49, 969-974 (1999)). This is a new family of potential exoelectrogens not reported in MFCs previously. FIG. 5 shows the phylogenetic tree for the organisms characterized from the clone-library of the day 162 sample from the MFC-B. The most dominant taxa present in the consortium was from the genus *Acidovorax* (100% sequence coverage, 99% similarity to Accession #AM084006-based on 16S rRNA). No organisms from this family have been reported in any MFC reported thus far. The make-up of this consortium is different from that of the MFC-A (FIG. 4 and Table 1). The dominant species as well as the extent of diversity is different. The major difference in the enrichment of the two consortia was the carbon starvation mode and the presence of cellulose in the carbon source. The exclusion of cellulose from the MFC-B may have resulted in the change in the dominant species in the MFC.

Figure 6:
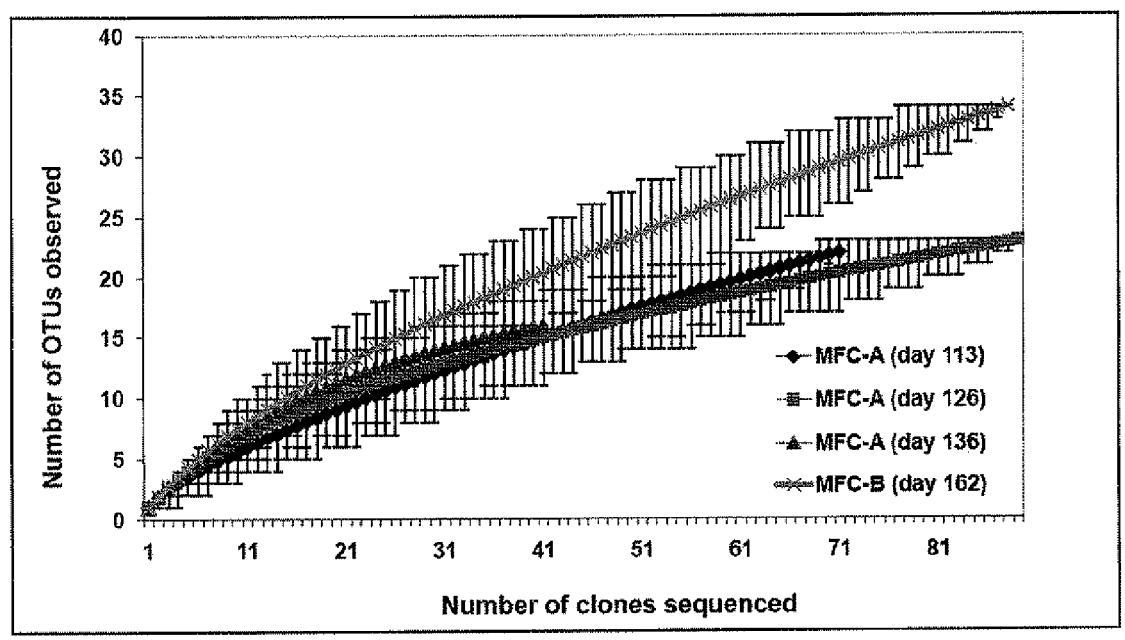
FIG. 6 Rarefaction curves with 95% confidence intervals for the clone libraries from each condition sampled. Number of operational taxonomic units (OTUs) was obtained for every clone library by use of the furthest-neighbor approach with a 97% sequence similarity cutoff. Curve leveling indicates saturation in recovering of clones.

FIG. 6 shows a rarefaction curve for four samples from the MFCs. It is observed that the sample from MFC-B has higher diversity than the samples from MFC-A. It should be noted that the inoculum for MFC-B was a sample from MFC-A collected on day 112. Thus, the organisms observed in MFC-B must have been present in the MFC-A (sample from day 113), but not at high enough concentrations. The absence of the carbon starvation mode in MFC-B may have resulted in higher diversity in this MFC, compared to MFC-A.

The second most dominant genus in the MFC-B consortium was an *Azospira* sp., which showed 99% similarity (with 93% sequence coverage) to members of a MFC community enriched by Angenent's group (Accession #EF515439). The organisms also showed 96% similarity to members of another MFC community reported by Kim, G. T., et al., *J. Appl. Microbiol*, 101, 698-710 (2006) (Accession #AJ630274). The third most dominant family found in the MFC-B (Beta Proteobacteria—Rhodocyclaceae) showed 90-99% similarity to a Proteobacterium, core-1 (Accession #AB 11104) reported to be present in an electrochemically-assisted iron-respiring consortium. The fourth family of organisms which had similarity to organisms reported in MFCs were the Aeromonadaceae. Three clones showed between 94-99% similarity to an organism reported in a bacterial community in a mediator-less MFC (Accession #EF679189). The rest of the community found in the MFC-B included organisms which had no similarity to MFC-derived organisms, but showed similarity to organisms capable of dechlorination, perchlorate reduction, selenate reduction and phenol degradation (FIG. 5). Additionally, 30% of the organisms from the clone-library had 95% or lower 16S rRNA similarity to any known cultured or uncultured organism in the NCBI gene database.

The two relatively different microbial consortia enriched in the MFC-A and MFC-B, both resulted in relatively high power density from the MFC. It is known that the design of the MFC is crucial in enabling high power densities. The work presented here shows that, in addition to the design, the operation of the MFC as well as the biocatalyst play important roles.

EXAMPLE 7

Imaging of MFC Biofilms

Imaging was used to confirm dominance of biofilm-forming organisms. Samples of the microbes growing on the electrode were collected by using a sterile tweezers to detach part of the carbon felt fibers from the anode electrode in an anaerobic chamber. The felt along with the biofilm/microbe samples were transferred onto a glass slide inside the anaerobic chamber itself. The cells were stained with Syto9 (Molecular Probes) live/dead stain (green/red) at a final concentration of 5 µM and imaged using a Leica TCS SP2 confocal laser scanning microscope.

Figure 3:
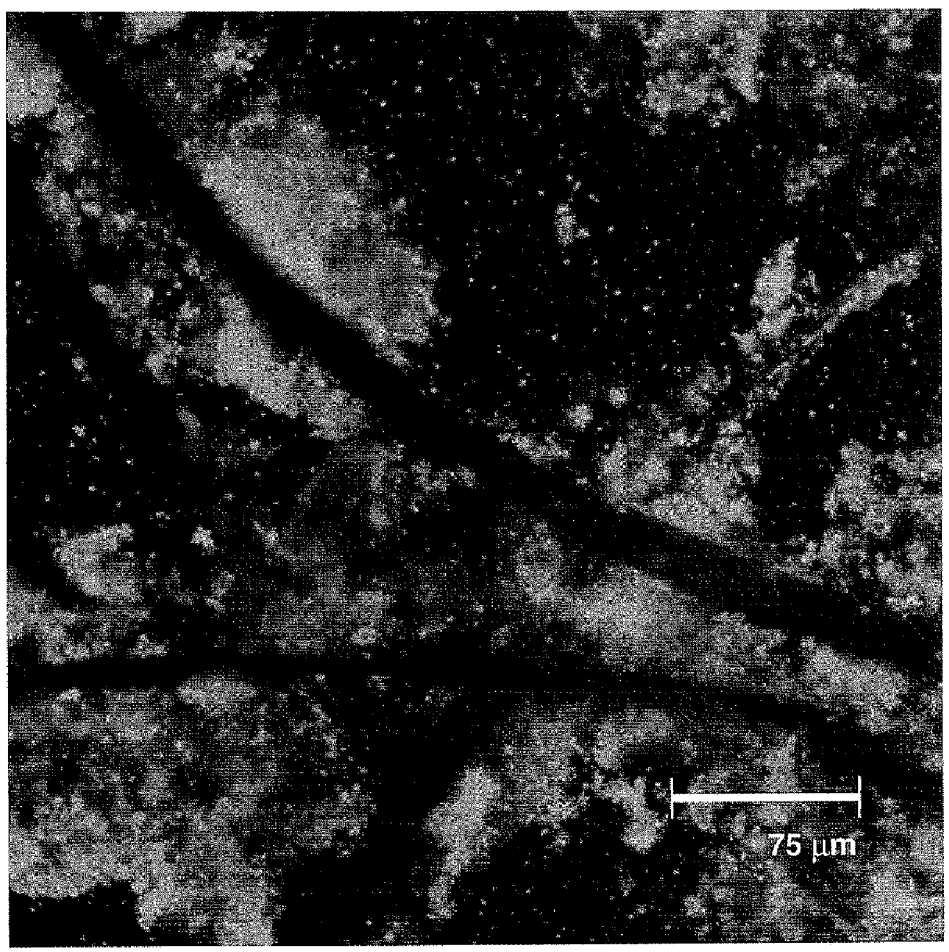
FIG. 3 Image of the microbial consortium inhabiting anode electrode (carbon felt) of the mixed carbon source MFC. The sample was stained with Syto9 (Molecular Probes). The community is seen to be dominated by biofilm-forming organisms.

FIG. 3 shows an image of the microbial community coating the carbon felt fibers from the MFC. A biofilm-dominated consortium is observed with presence of few planktonic cells. The biofilm thickness varied from a few microns to greater than 150 microns. The sample was stained with Syto9 (Molecular Probes). The community is seen to be dominated by biofilm-forming organisms.

What is claimed is:

1. A method for preparing a microbial fuel cell, the method comprising:
   inoculating an anodic liquid medium in contact with an anode of the microbial fuel cell with one or more types of microorganisms capable of functioning by an exoelectrogenic mechanism;
   establishing a biofilm of said microorganisms on and/or within said anode along with a substantial absence of planktonic forms of said microorganisms by substantial removal of said planktonic microorganisms during forced flow and recirculation conditions of said anodic liquid medium; and
   subjecting the microorganisms of the biofilm to a growth stage by incorporating one or more carbon-containing nutritive compounds in the anodic liquid medium during biofilm formation or after biofilm formation on the anode has been established,
wherein the anodic liquid medium is contained in an anode chamber and is separated by a cation-selective permeable material from a cathodic liquid medium in contact with a cathode, wherein the anode and cathode are in electrical communication.

2. The method of claim 1, wherein said biofilm and substantial absence of planktonic microorganisms is established by a process comprising periodic replacement of all or a portion of said anodic liquid medium.

3. The method of claim 2, wherein said anodic liquid medium is substantially replaced when an optical transmission parameter of the anodic liquid medium reaches a level indicative of the presence of planktonic microorganisms.

4. The method of claim 3, wherein the optical transmission parameter comprises optical density.

5. The method of claim 1, wherein the forced flow condition of the anodic liquid medium comprises a periodic flow rate of at least 35 mL/min.

6. The method of claim 1, wherein the forced flow condition of the anodic liquid medium comprises a continuous flow rate in the range of 2-10 mL/min, along with periodic interruption at a higher flow rate of at least 35 mL/min.

7. The method of claim 6, wherein said higher flow rate is at least 40 mL/min.

8. The method of claim 6, wherein said higher flow rate is at least 45 mL/min.

9. The method of claim 6, wherein said higher flow rate is at least 50 mL/min.

10. The method of claim 1, wherein said microorganisms comprise bacteria.

11. The method of claim 1, wherein said anode has a volume and the anode chamber has a volume, wherein a ratio of the volume of the anode to the volume of the anode chamber is at least 0.5.

12. The method of claim 11, wherein the ratio of the volume of the anode to the volume of the anode chamber is at least 0.8.

13. The method of claim 11, wherein the ratio of the volume of the anode to the volume of the anode chamber is at least 0.9.

14. The method of claim 11, wherein the ratio of the volume of the anode to the volume of the anode chamber is approximately 1, thereby attaining an essentially zero dead volume in the anode chamber.

15. The method of claim 1, wherein said anode comprises a form of elemental carbon.

16. The method of claim 15, wherein said anode comprises carbon fiber, carbon paper, carbon foam, carbon cloth, carbon felt, carbon wool, carbon granules, carbon brushes, or graphite.

17. The method of claim 1, wherein the cathode of said microbial fuel cell is a Pt/air electrode.

18. The method from claim 1, wherein said growth stage is achieved by incorporating one or more carbon-containing nutritive compounds in the anodic liquid medium after biofilm formation on the anode along with a substantial absence of planktonic forms of the microorganisms has been established.

19. The method from claim 1, wherein said growth stage is achieved by incorporating one or more carbon-containing nutritive compounds in the anodic liquid medium during the time that the biofilm is being established on the anode.

20. The method of claim 1, wherein said one or more carbon-containing nutritive compounds comprise one or more carboxylic acid-containing compounds and/or their salts.

21. The method of claim 1, wherein said one or more carbon-containing nutritive compounds comprise one or more monosaccharides, disaccharides, polysaccharides, or a combination thereof.

22. The method of claim 1, wherein the growth stage is continued until an electrical current output of the microbial fuel cell becomes level at a fixed resistance between the anode and cathode.

23. The method of claim 1, further comprising a starvation stage of the microorganisms after said growth stage of microorganisms, wherein carbon-containing nutritive compounds present in the anodic liquid medium are reduced below an amount necessary for the microorganisms to produce a maximum achievable current under conditions provided by the microbial fuel cell, for a period of time that permits enrichment of the biofilm with microorganisms capable of storing carbon internally.

24. The method of claim 1, further comprising reducing the electrical resistance of the microbial fuel cell in order to operate the microbial fuel cell at an increased electrical current output for a period of time sufficient to further enrich the biofilm with microorganisms capable of functioning by an exoelectrogenic mechanism.

25. The method of claim 1, further comprising reducing the electrical resistance of the microbial fuel cell in order to operate the microbial fuel cell at an increased electrical current output for a period of time sufficient to further enrich the biofilm with microorganisms capable of functioning by an exoelectrogenic mechanism.

26. The method of claim 23, further comprising reducing the electrical resistance of the microbial fuel cell in order to operate the microbial fuel cell at an increased electrical current output for a period of time sufficient to further enrich the biofilm with microorganisms capable of functioning by an exoelectrogenic mechanism.

27. A method for preparing a microbial fuel cell, the method comprising:
  (i) inoculating an anodic liquid medium in contact with an anode of the microbial fuel cell with one or more types of microorganisms capable of functioning by an exoelectrogenic mechanism; and
  (ii) establishing a biofilm of said microorganisms on and/or within said anode along with a substantial absence of planktonic forms of said microorganisms by substantial removal of said planktonic microorganisms during forced flow and recirculation conditions of said anodic liquid medium;
  (iii) subjecting the microorganisms of the biofilm to a growth stage by incorporating one or more carbon-containing nutritive compounds in the anodic liquid medium during or after biofilm formation on the anode has been established; and
  (iv) subjecting the microorganisms of the biofilm to a starvation stage after said growth stage by substantially eliminating carbon-containing nutritive compounds from the anodic liquid medium for a period of time in which enrichment of the biofilm with microorganisms capable of storing carbon internally is achieved,
wherein the anodic liquid medium is contained in an anode chamber and is separated by a cation-selective permeable material from a cathodic liquid medium in contact with a cathode, wherein the anode and cathode are in electrical communication.

28. A method for preparing a microbial fuel cell, the method comprising:
  (i) inoculating an anodic liquid medium in contact with an anode of the microbial fuel cell with one or more types of microorganisms capable of functioning by an exoelectrogenic mechanism; and
  (ii) establishing a biofilm of said microorganisms on and/or within said anode along with a substantial absence of planktonic forms of said microorganisms by substantial removal of said planktonic microorganisms during forced flow and recirculation conditions of said anodic liquid medium;
  (iii) subjecting the microorganisms of the biofilm to a growth stage by incorporating one or more carbon-containing nutritive compounds in the anodic liquid medium during or after biofilm formation on the anode has been established;
  (iv) subjecting the microorganisms of the biofilm to a starvation stage after said growth stage by substantially eliminating carbon-containing nutritive compounds from the anodic liquid medium for a period of time in which enrichment of the biofilm with microorganisms capable of storing carbon internally is achieved; and
  (v) reducing the electrical resistance of the microbial fuel cell in order to operate the microbial fuel cell at an increased electrical current output for a period of time sufficient to further enrich the biofilm with microorganisms capable of functioning by an exoelectrogenic mechanism,
wherein the anodic liquid medium is contained in an anode chamber and is separated by a cation-selective permeable material from a cathodic liquid medium in contact with a cathode, wherein the anode and cathode are in electrical communication.

29. The method of claim 28, wherein the step of reducing the electrical resistance of the microbial fuel cell is performed after said starvation stage.

30. A method for generating electricity, the method comprising operating a microbial fuel cell that has been prepared according to claim 1.

31. A method for generating electricity, the method comprising operating a microbial fuel cell that has been prepared according to claim 18.

32. A method for generating electricity, the method comprising operating a microbial fuel cell that has been prepared according to claim 23.

33. A method for generating electricity, the method comprising operating a microbial fuel cell that has been prepared according to claim 26.

34. A method for generating electricity, the method comprising operating a microbial fuel cell that has been prepared according to claim 27.

35. A method for generating electricity, the method comprising operating a microbial fuel cell that has been prepared according to claim 28.

36. A method for generating hydrogen gas, the method comprising operating a microbial fuel cell that has been prepared according to claim 1, except that said anodic and cathodic liquid media are optionally not separated, wherein operation of the microbial fuel cell is conducted under the condition that the cathode is constructed of a hydrogen-producing material and is deoxygenated, and adjusting the cell potential of the microbial fuel cell by application of an external voltage such that hydrogen is produced at the cathode.

37. A method for generating hydrogen gas, the method comprising operating a microbial fuel cell that has been prepared according to claim 23, except that said anodic and cathodic liquid media are optionally not separated, wherein operation of the microbial fuel cell is conducted under the condition that the cathode is constructed of a hydrogen-producing material and is deoxygenated, and adjusting the cell potential of the microbial fuel cell by application of an external voltage such that hydrogen is produced at the cathode.

38. A method for generating hydrogen gas, the method comprising operating a microbial fuel cell that has been prepared according to claim 26, except that said anodic and cathodic liquid media are optionally not separated, wherein operation of the microbial fuel cell is conducted under the condition that the cathode is constructed of a hydrogen-producing material and is deoxygenated, and adjusting the cell potential of the microbial fuel cell by application of an external voltage such that hydrogen is produced at the cathode.

39. A method for generating hydrogen gas, the method comprising operating a microbial fuel cell that has been prepared according to claim 27, except that said anodic and cathodic liquid media are optionally not separated, wherein operation of the microbial fuel cell is conducted under the condition that the cathode is constructed of a hydrogen-producing material and is deoxygenated, and adjusting the cell potential of the microbial fuel cell by application of an external voltage such that hydrogen is produced at the cathode.

40. A method for generating hydrogen gas, the method comprising operating a microbial fuel cell that has been prepared according to claim 28, wherein operation of the microbial fuel cell is conducted under the condition that the cathode is constructed of a hydrogen-producing material and is deoxygenated, and adjusting the cell potential of the microbial fuel cell by application of an external voltage such that hydrogen is produced at the cathode.

41. The method according to claim 36, wherein the cell potential is adjusted to at least 0.41 volts.

42. A microbial fuel cell prepared by the method of any of claims 1, 27, or 28.

43. A microbial fuel cell characterized by the presence of a biofilm of exoelectrogenic microorganisms on an anode of said microbial fuel cell, wherein said biofilm containing contains a portion of microorganisms capable of storing carbonaceous compounds or materials internally, and said biofilm is further characterized by a substantial absence of microorganisms possessing a planktonic tendency, wherein said anode is in electrical communication with a cathode, and said anode and cathode are in contact with, respectively, anodic and cathodic solutions that are separated by a cation-selective permeable membrane, and wherein said anode has a volume, and in anode chamber containing the anode has a volume, wherein a ratio of the volume of the anode to the volume of the anode chamber is at least 0.5, and wherein said substantial absence of microorganisms possessing a planktonic tendency has been achieved by forced flow and recirculation of said anodic solution.

44. The microbial fuel cell of claim 43, wherein the ratio of the volume of the anode to the volume of the anode chamber is approximately 1, thereby attaining an essentially zero dead volume in the anode chamber.

45. The method of claim 23, wherein carbon-containing nutritive compounds are substantially eliminated from the anodic liquid medium.

46. A method for reductively processing one or more electrochemically reducible species, the method comprising operating a microbial fuel cell that has been prepared according to claim 1, wherein operation of the microbial fuel cell is conducted under the condition that the cathode is in contact with said electrochemically reducible species.

47. The method of claim 46, wherein said electrochemically reducible species is a nitrate-containing compound or material.

48. The method of claim 46, wherein said electrochemically reducible species is a perchlorate-containing compound or material.

49. The method of claim 46, wherein said electrochemically reducible species is a metal-containing compound or material.

50. The method of claim 1, wherein in said method, there is a substantial absence of a mediator substance.

51. The microbial fuel cell of claim 43, wherein in said microbial fuel cell, there is a substantial absence of a mediator substance.

52. The method of claim 1, wherein the forced flow condition renders microorganisms which do not have a propensity for forming a biofilm waterborne to enable their removal.

53. The method of claim 1, wherein the biofilm contains a population of microorganisms enriched in microorganisms which contain cellular structures for binding to the anode and each other.

\* \* \* \* \*

SEQUENCE LISTING

<160> NUMBER OF SEQ ID NOS: 9

<210> SEQ ID NO 1
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 1
agagtttgat cctggctcag                                          20

<210> SEQ ID NO 2
<211> LENGTH: 18
<212> TYPE: DNA
<213> ORGANISM: Artificial Sequence
<220> FEATURE:
<223> OTHER INFORMATION: Synthetic oligonucleotide

<400> SEQUENCE: 2
ggttaccttt tacgactt                                            18

<210> SEQ ID NO 3
<211> LENGTH: 17
<212> TYPE: DNA
<213> ORGANISM: Artificial Sequence
<220> FEATURE:
<223> OTHER INFORMATION: Synthetic oligonucleotide

<400> SEQUENCE: 3

```
attaccgcgg ctgctgg                                                    17

<210> SEQ ID NO 4
<211> LENGTH: 60
<212> TYPE: DNA
<213> ORGANISM: Artificial Sequence
<220> FEATURE:
<223> OTHER INFORMATION: Synthetic oligonucleotide

<400> SEQUENCE: 4
cgcccgccgc gcgcggcggg cggggcgggg gcacgggggg actcctacgg gaggcagcag    60

<210> SEQ ID NO 5
<211> LENGTH: 15
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (1)..(1)
<223> OTHER INFORMATION: n is C or T
<220> FEATURE:
<221> NAME/KEY: misc_feature
<222> LOCATION: (12)..(12)
<223> OTHER INFORMATION: n is G or A

<400> SEQUENCE: 5
ntaagccatg cnagt                                                      15

<210> SEQ ID NO 6
<211> LENGTH: 18
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (1)..(1)
<223> OTHER INFORMATION: n is T or C
<220> FEATURE:
<221> NAME/KEY: misc_feature
<222> LOCATION: (16)..(16)
<223> OTHER INFORMATION: n is G or A

<400> SEQUENCE: 6
ngggtctcgc tcgttncc                                                   18

<210> SEQ ID NO 7
<211> LENGTH: 18
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (11)..(11)
<223> OTHER INFORMATION: n is C or T
<220> FEATURE:
<221> NAME/KEY: misc_feature
<222> LOCATION: (15)..(15)
<223> OTHER INFORMATION: n is G or C

<400> SEQUENCE: 7
ccctacgggg ngcancag                                                   18

<210> SEQ ID NO 8
<211> LENGTH: 15
<212> TYPE: DNA
<213> ORGANISM: Artificial Sequence
```

```
-continued

<220> FEATURE:
<223> OTHER INFORMATION: Synthetic oligonucleotide
<220> FEATURE:
<221> NAME/KEY: misc_feature
<222> LOCATION: (11)..(11)
<223> OTHER INFORMATION: n is G or T

<400> SEQUENCE: 8
ttaccgcggc ngctg                                                  15

<210> SEQ ID NO 9
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 9
actcctacgg gaggcagcag                                             20
```